United States Patent [19]
Denissenko et al.

[11] 3,992,335
[45] Nov. 16, 1976

[54] SELF-SHINING FLOOR CARE COMPOSITIONS

[75] Inventors: Serge Denissenko, Migne-Auxances, France; Joachim Dazzi, Riehen, Switzerland

[73] Assignee: Airwick Industries, Incorporated, Carlstadt, N.J.

[22] Filed: Oct. 19, 1973

[21] Appl. No.: 408,144

Related U.S. Application Data

[63] Continuation-in-part of Ser. No. 89,057, Nov. 12, 1970, abandoned.

[30] Foreign Application Priority Data
Nov. 14, 1969 France .............................. 69.39210

[52] U.S. Cl. ............................ 260/13; 106/5; 106/106; 106/173 R; 106/177; 106/178; 106/186; 106/188; 106/189; 106/200; 260/15; 260/17 A; 260/174 SG; 260/24; 260/33.4 R; 260/97

[51] Int. Cl.² ........................................ C09G 1/16

[58] Field of Search .......... 260/13, 17, 15, 17.4 SG, 260/64, 33.4 R, 24, 97; 106/5, 106, 173, 177, 178, 186, 188, 189, 200

[56] References Cited
UNITED STATES PATENTS

| | | | |
|---|---|---|---|
| 2,978,422 | 4/1961 | Meister | 260/17.4 |
| 3,211,689 | 10/1965 | Darby | 260/31.4 |
| 3,254,049 | 5/1966 | Cole et al. | 260/41 |
| 3,374,235 | 3/1968 | Varsanyi et al. | 260/249.6 |
| 3,410,855 | 11/1968 | Varsanyi et al. | 260/249.6 |
| 3,413,252 | 11/1968 | Lima | 260/28.5 |
| 3,477,969 | 11/1969 | Parker | 260/17 |
| 3,546,158 | 12/1970 | Champion, Jr. et al. | 260/41 |

*Primary Examiner*—Lester L. Lee
*Attorney, Agent, or Firm*—Harry Falber; Karl F. Jorda; Vincent J. Cavalieri

[57] ABSTRACT

A composition capable of rendering the surface of a substrate such as a wooden parquet floor shiny, without prior stripping and without subsequent polishing, by simply applying and drying the same on such surface, and which composition is a true, anhydrous solution, comprising at least six and preferably seven constituents which consist, in critical proportions, of a solid, film-forming macromolecular compound, a hard resin, a liquid plasticizer, a solid plasticizer and a solvent mixture consisting of at least one lower alkanol and a liquid co-solvent, as well as, as an optional seventh component, of a silicone oil, all of which constituents must fulfill certain physical and/or physicochemical requirements in order to obtain a fully satisfactory anhydrous floor care agent.

14 Claims, No Drawings

SELF-SHINING FLOOR CARE COMPOSITIONS

This application is a continuation-in-part of our patent application Ser. No. 89,057 filed on Nov. 12, 1970, now abandoned.

BACKGROUND OF THE INVENTION

The invention relates to coatings imparting gloss to parquet floors and surfaces of other articles such as furniture, woodwork, leather articles such as shoes, and the like. The invention relates moreover particularly to floor care agents (or polishes) producing such coatings on the above-mentioned surfaces.

Hitherto, two methods have been available for shining a parquet floor:

The first of these methods consists in the application of conventional polishes which are solutions, or preferably colloidal suspensions, of waxy materials in appropriate liquids and which, after they have been spread on the floor and dried, must be mechanically polished, e.g. by rubbing with a cloth, so as to display the desired shine. These products permit a glossy and satin-like surface to be obtained which the user desires and to which he has been accustomed ever since the use of beeswax.

However, these products, even the most recent products currently available on the market, suffer from several important disadvantages; the delicate nature of the waxy coating causes the same to be altered by the least walking or the like passage over the floor, which causes streaks, matt traces and the like on the surface of the parquet floor. Whilst parquet floors treated in this way can be repaired by simple polishing, they require constant maintenance (re-polishing). They are also sensitive to spillage of liquids, which causes strains. Furthermore, since the layer of wax is of little strength, it is progressively worn away and carried away by passages over the floor; thus, polish must frequently be applied to them. Finally, the parquet floors treated in this way are slippery, especially for people wearing shoes with leather soles.

A second currently known method of polishing consists of the use of glossy varnishes which, when applied after thorough stripping, and usually careful rubbing down of the parquet floors, give a very glossy and relatively hard surface. Apart from the fact that they can be dusted or washed, they have the advantage of avoiding frequent attention for a year or several years, depending on the characteristics of the preparations. However, they suffer from certain disadvantages; they are labor-consuming and expensive to apply; they must in the majority of cases be applied by specialists. The shine obtained is frequently considered to have a cold sparkle. Finally, they cannot be repaired if they are scratched.

As far as we know, no product currently exists which simultaneously possesses the good characteristics of shining immediately, of adhering, of being flexible, of lending itself to simple, instant repair, or of being applicable on top of an old layer of waxy materials and of imparting to the wood, after application, a satin-like appearance comparable to that of a conventional polish after polishing.

It is true that aqueous emulsion compositions already exist which, when applied to certain surfaces, result in the formation of glossy films of their own accord, but these emulsions cannot be applied to parquet floors because of their water content. (The Chemical Formulary, 1961, Vol. XI and 1967, Vol. XIII).

Polishes for the care of parquet floors also exist which are derived from varnishes and which are self-shining, but they demand that the parquet floors should be stripped beforehand, which as a result annuls all their value. Such coating-forming compositions for the care of floors and the like surfaces comprise, in a true anhydrous solution, a. a film-forming varnish-constituent agent,
b. a varnish-constituent hard resin,
c. a plasticizing agent for plasticizing at least one of components (a) and (b), and
d. a volatile solvent mixture inert to components (a) through (c) and forming a clear true solution therewith.

Coatings are obtained from these floor care agents and the like polishes by applying the floor care or the like polish, Preferably by spraying from an aerosol dispenser, on to the surface to be treated, whereupon the components (d) and (e) evaporate with formation of the dry film constituted by the intimate mixture of (a), (b) and (c).

OBJECTS AND SUMMARY OF THE INVENTION

The present application has as a principle object to provide surface coatings and self-shining floor polishes for producing them, which are free from these various drawbacks.

Its objects is, amongst others, to provide a new class of coatings in the form of a surface film which is glossy by itself as soon as it is dry, which adheres well to wood, and which is transparent, much more durable and resistant to wear than a film obtained with a conventional polish and which is stable to light and insensitive to moisture. Such films according to the invention can be produced from the novel polishes on parquet floors which have already been waxed previously, without prior stripping and without it being in any way necessary to rub or polish the surface subsequently to applying the polish composition.

It has been another object of the invention to provide floor care compositions which offer the important advantage of leaving, after drying, a film on a parquet floor which can be repaired, in particular freed of possible scratches or similar changes, by simply passing over it once with a soft cloth or with a polishing brush.

A further object of the invention is to provide films from floor care compositions, which, once they are formed on a surface such as a parquet floor, can be washed and are more resistant to stains than the known polishes but which can, if the user wishes, be re-covered with conventional waxes without any softening or tackiness resulting in the superimposed wax film or coating.

These objects are attained by the coatings and floor care agents according to the invention, which are capable of rendering the surface of a substrate such as a wooden parquet floor shiny, without prior stripping and without subsequent polishing, by simply applying and letting them dry on such surface. These floor care compositions are true, anhydrous solutions of the type described hereinbefore, having constituents (a) to (d) inclusive, and are improved by containing in combination, as said plasticizing agent (c) a mixture of:

(c′) from 0.05, and preferably from about 1 to 20%, based on the total weight of the liquid polish composition, of a liquid organic, hard resin-plasticizing compound (D) which has a melting point below 15° C, a molecular weight above 150, a viscosity, in undissolved state and at 20° C, of from 50 centipoises to 1000 poises, an acid number of at most 50, a refraction index at 20° C of from 1.350 to 1.550, a vapor pressure at 20° C of less than 0.001 Torr, said liquid plasticizing compound being completely soluble in the volatile solvent mixture (d), supra, and a drop of 0.1 gram of this liquid plasticizing compound placed on a glass plate requiring, at 20° C and under an ambient air pressure of 760 Torr, more than 2 hours for complete evaporation; and this plasticizing compound on being heated at 100° for 100 hours shows a weight loss which ranges from 1 to 2.5% of the initial weight of the plasticizing compound; from 0 to at most 4%, calculated on the total weight of the floor care composition, of the liquid plasticizing agent consisting of a silicone oil (C) having at 25° C a viscosity ranging from 0.5 to 100,000 centistokes; and (c'') from about 0.1 to 15%, based on the total weight of the floor care composition, of a solid plasticizing compound (E) which is compatible and miscible with compound (D) and has a melting point above 40° C, a penetration index at 20° C between 1 and 80, a cube of 0.1 gram of said solid plasticizing compound placed on a glass plate at 20° C and under an ambient pressure of 760 Torr requires more than 2 hours for its complete evaporation, said solid plasticizing compound being completely soluble in the volatile solvent mixture (d) defined further below, and being capable of plasticizing at least the film-forming agent (a) or the hard resin (b).

When the liquid plasticizer (D) is free from silicone (C) its proportion in the liquid anhydrous polish compositions is preferably from 1 to 20% and most preferably from 3 to 15%, based on the total weight of the liquid polish composition; when silicone (C) is present in the liquid composition, the proportion of (D) ranges preferably from 0.1 to 15%; the proportion of silicone (C) ranges from 0.05 to 4% and preferably from 1 to 4%, all based on the total weight of the liquid composition.

In very easily repairable coatings and coating-producing compositions according to the invention, the said film-forming agent (a) must be a solid macromolecular organic compound (A) which is independently film-forming or capable of being rendered film-forming by admixture therewith of from about 1 to 5% of a plasticizer, while being incapable by itself of plasticizing the said hard resin (b); the said film-forming compound (A) has at 20° C a Tukon hardness of at most 10 and, when plasticized in a molar ratio of 3:1 with dibutyl phthalate, has at 20° C a Sward hardness between 2 and 30; the said film-forming compound (A) must be well soluble in at least one of ethanol and isopropanol and must be present in the said floor care composition in a proportion of from 3 to 35% calculated on the weight of the liquid floor care composition; and The said varnish-constituent hard resin (b) must be a hard resin (B) which is not film-forming by itself and insoluble in hydrocarbon solvents, which must have a Tukon hardness at 20° C above 10 and, plasticized in a molar ratio of 3:1 with dibutyl phthalate, a Sward hardness at 20° C greater than 50; the lower limit temperature of its softening range should preferably not be less than 60° C, and preferably at least 80° C. This hard resin must, of course, be compatible with constituents (A), (E) and (D) and should be well soluble in at least one of ethanol and isopropanol, and be present in a proportion of from 0.5 to 15% in the liquid floor care composition, calculated on the weight of the latter.

In the aforesaid liquid compositions affording very easily repairable coatings according to the invention, the volatile solvent mixture (D) should be a mixture of an alkanol (F) of from 1 to 4 carbon atoms, present in a proportion of about 25 to 90% calculated on the weight of the floor care composition, and the organic solvent (G) must be chemically unreactive (inert) toward all the other constituents, and should be present in a proportion of 1 to 45% calculated on the weight of the floor care composition; this organic solvent should contain per molecule thereof from 0 to 2 hydroxyl groups and preferably be free from amino-nitrogen, imino-nitrogen and sulfur; and, when containing per molecule a single hydroxyl group and being otherwise free from oxygen atoms, solvent (G) should have at least five carbon atoms per molecule; the melting point of solvent (G) should be below 15° C, its boiling point between 50° and 300° C, its viscosity at 20° C below 30 centipoises and, when its molecule is free of hydroxyl groups, a droplet of 0.5 milliliters thereof placed on a glass plate must evaporate at 20° C and an ambient air pressure of 760 Torr in less than 3000 seconds, and when its molecule contains from 1 to 2 hydroxyl groups, a droplet of 0.5 milliliters thereof should evaporate at 20° C and 760 Torr in an interval of from 34 to 3000 seconds. Solvent (G) must be miscible with the alkanol (F) in the given proportion at room temperature.

Constituents (A), (B), (D) and (E) must form clear solutions in amounts corresponding to the proportions given hereinbefore, in a mixture of constituents (F) and (G).

The floor care compositions according to the invention may contain optionally up to at most 5% of one or several adjuvants such as colouring matter, absorbants for ultraviolet radiation, perfumes, insecticides, bactericides, fungicides, inert filler materials and/or polytetrafluoroethylene.

Preferably, each of the constituents (A), (B), (D) and (E) in soluble, in amounts corresponding to the above-given proportions, and at room temperatures, in the alkanol (F) alone, as well as in mixtures of (F) and (G).

In those preferred self-shining compositions according to the invention which are particularly suitable for use in aerosol dispensers, the constituent (C) is present in a concentration of about 0.05 to 4% calculated on the total weight of the composition.

Compositions according to the invention can also be used as floor care agents by simply pouring them onto a surface to be treated therewith. In this kind of application, a self-shining film of considerable capability of being repaired by simple rubbing with a cloth is obtained also with compositions from which the constituent (C) is absent.

The mixture of components (D) and (E) in the inventive combination of constituents supplies an indispensable "malleability" and a good repairability of scratches and the like traces in the film coating formed after application and drying of compositions of the invention on wooden parquet floors.

It has been found that film coatings on parquets and similar surfaces can be obtained with a satisfactory self-shine, durability, pliability, adherence to previously waxed floors and satisfactory repairability of scratches and the like only when the film comprises a quaternary system of constituents (A), (B), (D) and (E), (D) optionally comprising, or being constituted by, a small amount of constituent (C). It has not been possible to find a system of this type, in which a single substance would replace the two constituents (A) and (B), and which would yet have the same satisfactory properties.

The term "macromolecular" indicates that the molecular weight is 1000 or exceeds 1000.

The proportions by weight of the components, relative to the total weight of preferred polishes and coatings are:

|    |                      | liquid polish: | coating:    |
|----|----------------------|----------------|-------------|
| A) | film-former:         | 5 to 15%       | 10 to 70%   |
| B) | hard resin:          | 1 to 10%       | 3 to 55%    |
| C) | silicone, if present:| 0.1 to 4%      | 0.3 to 25%  |
| D) | liquid plasticizer:  | 0.1 to 15%     | 2 to 70%    |
| E) | solid plasticizer:   | 0.25 to 8%     | 1 to 50%    |
| F) | alkanol:             | 30 to 55%      | —           |
| G) | co-solvent:          | 5 to 40%       | —           |

Particularly preferred coatings according to the invention contain the following proportions of constituents (A) to (E):

A. from 10 to 70%, optionally 15 to 55%;
B. from 5 to 50%, (All % for the coatings in
D. from 10 to 70% this and the preceding table are
E. from 1 to 50% based on the total weight of the coating.)

It has been found, moreover, that fully satisfactory self-gloss coatings and polish compositions producing them, in accordance with the invention, are obtained from film-forming varnish-constituent compounds (A), varnish-constituent hard resins (B) and liquid and solid plasticizing compounds (D) and (E) independently of whether their molecules have a structure falling under a particular chemical class of compounds, as long as these compounds fulfill the physical conditions defined hereinbefore, as to melting points, molecular weight, viscosity, refraction indices, vapor pressures and other evaporation data, hardness (Tukon, Sward, penetration index) and solubility in components (F) and (G) and their mixtures, and as long as they are free from reactive groupings capable of causing chemical reactions (as opposed to dissolution in a solid or liquid phase) between two or more components of the aforesaid coatings and polishes. In other words, these components must be compatible with each other and with the components (F) and (G) present in the polish compositions which afford the coatings according to the invention.

Classes of macromolecular or resin compounds excluded from the constituents (A) and (E) due to the fact that, in the case of (A) and (B), their solubility in ethanol and/or isopropanol, and, in the case of (D) and (E), in a mixture thereof with component (G) is not satisfactory (i.e., that more than 50 parts by weight of solvent are required to dissolve one part by weight of the aforesaid constituent forming a solution stable at 20° C), are the following:

cellulose, benzylcellulose, polychlorobutadiene, polyvinylchloride, polyvinylidene chloride, polyvinylidene fluoride, acrylonitrile-butadiene-styrene copolymers, styrene-butadiene copolymers, polytrifluoromonochloroethylene, polytetrafluoroethylene, perfluoropropylene, vinylchloride-vinyl acetate copolymers, coumarone-indene resins, hardened epoxy resins, natural caoutchouc, polyacrylic amide, polyacrlonitrile, polymethacrylates except those specifically defined hereinafter, polyamides except those defined hereinafter, polybutadiene, polyisobutylene, polyisoprene, polycarbonates, polyesters except certain esters defined hereinafter, polyaldehydes, polyketones, polyoxymethylene, polystyrene, polyurethanes, polyvinylacetals with the exception of those defined hereinafter, polyvinylalcohol, polyvinylcarbazoles (as to the insolubility of the aforesaid substances see "Krause/Lange Kunststoff-Bestimmungsmoaglichkeiten" published by Carl Hanser Verlag, Munich, Germany in 1965 and 1970 (pages 25 – 32 of the 1970 edition).

Other macromolecular products unsuitable for use in the coatings and polish compositions according to the invention because they are insufficiently soluble or insoluble in ethanol, isopropanol, or ethanol/isopropanol mixtures, although they are soluble in such solvents as dimethylformamide, dimethylsulfoxide, or trifluoroacetic acid, are polyesterimides, polybenzoxyzolimides, polyamideimides, polybenzimidazoles, polythiazoles, polytetrazopyrenenes, polyhydrazides and most polytriazoles; insoluble are also polyimides, polyoxazoles, polyoxadiazoles, polypyrones and polyacens (see Erich Behr, "Hochtemperaturbestandige Kunststoffe "published by Carl Hanser Verlag, Munich, Germany in 1969, especially pages 124–125).

Moreover, it is not difficult to determine whether a polymeric substance has a satisfactory solubility for the purposes of the instant invention or not.

Reference is also had to "Lackkunstharze" by H. W. Wagner and H. F. Sarx, published by Carl Hanser Verlag, Munich, Germany (1959, 1971) and "Polymer Handbook" by J. Brandrup and E. H. Immergut, published by Interscience Publishers, New-York, N.Y. (1966), especially p. IV - 185 et seq) for other varnish constituent film-forming and hard resins soluble in lower alkanols.

Only substances having that required solubility need be tested for the other physical properties given hereinbefore in defining the components (A) to (E) of the coatings and liquid polish compositions according to the invention.

There are given hereinafter, by way of non-limitative examples only, a number of chemical classes of compounds for each of the components (A) to (E) and also for the co-solvent (G), which classes are to indicate those in which these components are readily commercially available, without, however, restricting the invention to these classes, as properties limiting the scope of our invention are those physical ones defined herein and in the appended claims.

All parts and percentages given hereinafter and in the appended claims are by weight unless expressly stated otherwise; all data refer to 20° C and 760 Torr ambient conditions unless expressly stated otherwise.

A. The macromolecular compound can be chosen from the following commercially available classes of film-forming varnish constituents:

A 1

Organic esters of cellulose, obtained by partial esterification of the hydroxyl groups of cellulose by organic monocarboxylic acids or mixtures of such acids, preferably the acetate, acetobutyrate and propionate esters.

The viscosity of these organic esters of cellulose dissolved in ethanol can vary from 0.1 to 200 poises at a temperature of 20° C (ASTM D-1343-54 T method, carried out on a solution prepared according to Formula A of the ASTM D-871-54 T method), but the esters of viscosity 0.1 to 10 poises are preferred. Preferred cellulose esters are those of alkanoic and alkenoic acids having at most 5 carbon atoms.

A 2

Cellulose nitrates.

A 3

Cellulose ethers (alkylcelluloses and carboxyalkylcelluloses); preferred are those ethers of alkyl and/or hydroxy-alkyl groups having lower molecular weight. ($C_1$-$C_4$)

A 4

Polyvinyl esters of aliphatic acids of at most 4 carbon atoms, the melting point of which esters can vary from 60° to 220° C, and preferably the polyvinyl acetates of melting point between 60° and 110° C.

A 5

Polyvinyl ketals, in particular polyvinyl acetals. Their content of

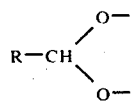

groups can vary from 65 to 85%, but those which contain 72 to 80% are preferred; the content of R—COO groups can vary from about 1 to 2%, but acetals containing about 2% thereof are preferred, the content of free OH groups linked to rests R can vary from 10 to 33 and preferably from 10 to 30%, with the range of 17 – 22% being preferred. R represents lower alkyl ($C_1$ to $C_4$).

The "Höppler" viscosities of these ketals can be: 2 to 115 centipoises, with the range of 2–5 cP being preferred, for 6% strength solutions in methanol at 20° C, 5 to 125 cP, and preferably 5–10 cP, for 5% strength solutions in 85% strength ethyl alcohol at 25° C, and 10 to 300 cP, and preferably 10–20 cP, for 5% strength solutions in butanol at 20° C.

Other suitable compounds of this class are the polyvinyl butyrals produced by the reaction of butyraldehyde with polyvinyl alcohols, in which the percentage by weight of polyvinyl alcohol groups in the molecule can vary from 10 to 25%, and preferably from 17 to 21%.

The viscosity of a 5% strength solution of polyvinyl acetal or butyral in 95% strength ethyl alcohol at 20° C can vary from 5 to 110 centipoises, preferably from 5 to 15 centipoises.

The designation polyvinyl is intended to indicate that the product has resulted from the condensation of a vinyl monomer. The polyvinyl chains have a 1,3-glycol structure corresponding to the following formula:

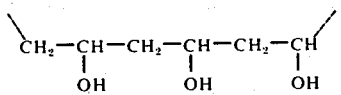 (I)

A 6

Phenoplastics being condensation products of formaldehyde and phenol in a molar ratio of from 1:1 to 1:2, preferably the phenoplastics which have been modified by incorporating higher fatty acids ($C_{10}$ – $C_{22}$) and/or polyesters of dicarboxylic acids, the esters of glycol or glycerol and adipic, azelaic, sebacic acid or phthalic acid, and other esters of this type which phenoplastics have a viscosity which can vary from 8 to 40 poises at 20° C (for a 60% strength solution in butanol, Höppler method), and preferably a viscosity of between 10 and 15 poises.

A 7

Aminoplastics which have been modified preferably by condensation with polyesters of aliphatic polycarboxylic acids and of polyalcohols, and/or by any other type of iternal internal The flow time of a 60% strength solution of modified aminoplastic in butanol, at 20° C, in the DIN 4 cup, can vary from 150 to 800 seconds, but modified aminoplastics which under these conditions give flow times of 550 to 650 seconds are preferred.

A 8

Polyamide resins soluble in alkanols of 1 to 4 carbon atoms and having, in 10%-ethanol solution, a viscosity at 20° C ranging from about 1 to 500 centipoises, preferably the products of the condensation of dimerised fatty acids and polyamides, such as the polyalkylenepolyamides, copolymers such as nylons 6, 6.6 and 10.6, and modified nylons, such as the N-alkoxy-nylons.

A 9

Acrylic ester polymers being polyesters of acrylic and methacrylic acids with lower alkanols ($C_1$ – $C_6$).

Poly(isobutyl methacrylates), poly(n-butyl methacrylates) and isobutyl/n-butyl copolymers are preferred.

Their Tukon hardness can vary from 1 to 10 and is preferably from 4 to 10 and is a measure for their degree of polymerization. A 10%-isopropanol solution of these esters has a viscosity of from 100 to 2,000 centipoises.

A 10

Resin acids, and preferably polymers originating from oleo-resins secreted by conifers and having a molecular weight above 300, such as colophony, U.S. Pat. Nos. 2,086,777 and 2,239,555 describe processes for obtaining such resin acids.

The hard resin (B) is preferably chosen from one of the following commercially available classes:

B 1

Aldehyde/ketone resins having a molar ratio of aldehyde-to-ketone of about 1:1 (for example, Ketone resin A, sold by the German company BADISCHE ANILIN UND SODA FABRIC of Ludwigshafen, or Ketone resin SK, sold by the German company CHEMISCHE WERKE HULS, of Marl, both in Germany which are cyclohexanone-formaldehyde resins having a refraction index of 1.54).

B 2

Esters of polyacrylic acid and lower alkanols ($C_1$ – $C_4$) (lower polyacrylic resins).

Polyacrylic resins of which the Tukon hardness is greater than 10, and which are obtained by polymerisation of methyl acrylate, methyl methacrylate, ethyl methacrylate, n-butyl methacrylate or isobutyl methacrylate, or by copolymerisation of n-butyl methacrylate and isobutyl methacrylate, methyl methacrylate and n-butyl methacrylate, methyl methacrylate and isobutyl methacrylate, ethyl methacrylate and n-butyl methacrylate, or ethyl methacrylate and isobutyl methacrylate, are preferred, though of course this list of preferred polyacrylics is not intended to be limiting.

B 3

Esters of monomeric resin acids, preferably the esters of colophony resin acids (abietic acid etc.) which possess at least one carboxyl group, esterified with organic compounds possessing at least one hydroxyl group such as, preferably, the lower alkanols ($C_1$–$C_4$).

B 3A

Condensation products of monomeric resin acids such as dimerized abietic acid with fumaric or maleic acid, e.g. of the formula:

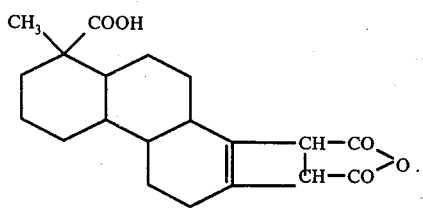

Their production is described, for instance, in U.S. Pat. No. 2,628,226.

B 4

Polyesters of organic non-resinous polycarboxylic acids, and of monomeric polyhydric alcohols, such as phthalic resins, preferably resins having an acid number of about 100 to 250 and a melting range of from 80° – 150° C. Particularly suitable are poly-(ethylene glycol fumarate) (refr. index 1.514), poly(ethylene glycol terephthalate) (Refr. index 1.51). ($n_D^{20}$)

B 5

Products originating from the polycondensation of phenolic compounds with formaldehyde preferably in a molar ratio of about 1:1 and having a melting range of about 60° to 100° C which products are unmodified.

B 6

Resins originating from the condensation of malamine (2.4.6-triamino-triazine) with formaldehyde, preferably in a molar ratio of about 1:1 and having a melting range of about 60° to 100° C.

B 7

Resinous condensation products of urea and formaldehyde, so-called urea-formaldehyde resins, preferably in a molar ratio of about 1:1 and in unmodified form.

B 8

Styrene resins, being the condensation products of styrene and maleic acid anhydride preferably in a molar ratio of from 2:1 to 1:2 and optionally with a molecular weight of about 2000.

B 9

Solid silicone resins, corresponding to the general three-dimensional structure

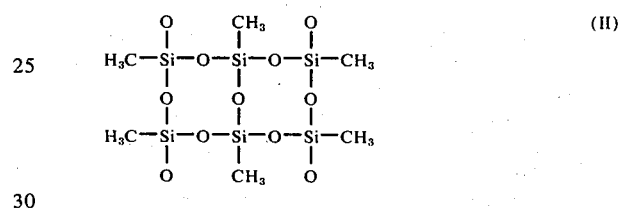

B 10

Solid triazines of properties similar to those of resins and having at 20° C a Tukon hardness greater than 10 and being insoluble in hydrocarbon solvents, which triazines fall under the formula

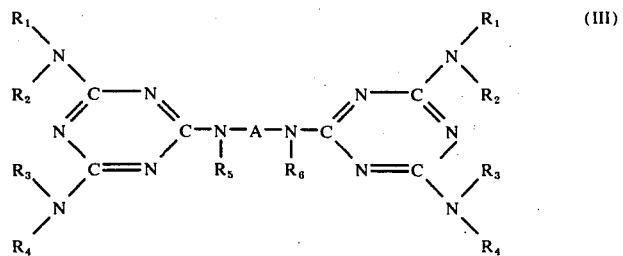

wherein
A represents an alkylene group of from 2 to 6 carbon atoms, at least two of which form a chain between the two adjacent nitrogen atoms, or the group

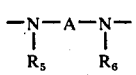

represents the group N,N'-piperazine-diyl, or the group

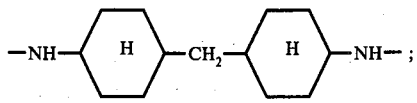

each of $R_1$ and $R_3$, independently of the other, represents a hydrogen atom or a saturated and preferably aliphatic hydrocarbon radical having from one to 18 carbon atoms, each of $R_2$ and $R_4$ represents, independently of the other, an alkyl group having from one to 18 carbon atoms or a monocyclic aralkyl group in which the alkyl portion has at most 4 carbon atoms, or a phenyl group any substituent of which is selected from chlorine, fluorine, bromin and alkyl of at most 12 carbon atoms, or each of the pairs $R_1/R_2$ and $R_3/R_4$ taken together with the respective nitrogen atom to which it is linked, represents a group selected from pyrrolidino, piperidino, hexamethylene-imino, morpholino and N-methyl-piperazino and each of $R_5$ and $R_6$ represents hydrogen or an alkyl group of from 1 to 4 carbon atoms.

In agreement with the physical properties of Component (B), those compounds falling under Formula III are especially suitable as such component in the molecules of which a. $R_1$ and $R_2$ represent alkyl groups having relatively short chains, taking into account that the shorter $R_1$, $R_2$, $R_3$ and $R_4$, the longer is the chain of A, and that the number of carbon atoms of A, $R_1$, $R_2$, $R_3$ and $R_4$ taken together should not exceed 18 when $R_5$ and $R_6$ are hydrogen; or b. each of $R_5$ and $R_6$ represent a preferably lower alkyl group.

Most preferred among the above described types of compounds falling under Formula III are those in which A represents alkylene of from 2 to 6, and optimally 2 to 4 carbon atoms.

B 11 solid triazines of the formula

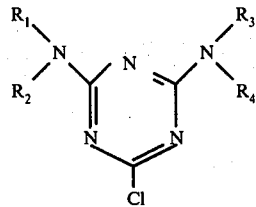

(III A)

in which each of $R_1$ and $R_3$ represents a saturated aliphatic hydrocarbon radical of from one to 4 carbon atoms and each of $R_2$ and $R_4$ represents a phenyl group.

Liquid and solid plasticizers for varnish-constituent polymers are described by A. Krause and A. Lange in "Kunstoff-Bestimmungsmoglichkeiten", supra, on pages 147–164. Any of the plasticizers fulfilling the physical requirements given hereinbefore for liquid plasticizers (D) inclusive of (C) and for solid plasticizers (E) can, of course, be used in the coatings and polish compositions according to the invention.

Preferably the liquid plasticiser (D) is chosen from amongst the liquid organic hard resin plasticizing compounds having a viscosity within the limits given hereinbefore and which is preferably between 200 cP and 30,000 cP. Its volatility is preferably such that on being heated at 100° C for 100 hours there is a weight loss of from 1 to 2.5%. Its vapor pressure must be less than 0.001 Torr at 20° C. Its refraction index $n_D^{20}$ is preferably greater than 1.500.

Liquid plasticisers which conform to the above mentioned conditions are conveniently chosen from the following commercially available chemical classes:

D 1

Monomeric esters of resin acids, preferably of the resin acids of colophony, and of aliphatic alcohols containing preferably from one to two hydroxyl groups per molecule and being free from ether groups (C — O — C bridges).

D 2

Monomeric esters of resin acids, and preferably of the resin acids of colophony, and of ethers of polyhydric alcohols, having preferably from 2 to 3 hydroxyl groups of which one is etherified by lower alkyl. Preferred are particularly the soft resins obtained from resinic acids and diethylene glycol.

D 3

Monomeric esters of organic mono-/or polycarboxylic preferably aliphatic non-resinic acids and of aliphatic monomeric alcohols having from 1 to 12 hydroxyl groups. Preferred are:

3a. the acetobutyrates and acetoisobutyrates of sucrose and the oleates of alkanols having from 8 to 16 carbon atoms;

3b. the monoglycerides, diglycerides and triglycerides of such organic carboxylic non-resinic acids having at least 4 carbon atoms, and preferably of those, which are aliphatic unsaturated and have from 10 to 20 carbon atoms, such as the glycerol mono-oleates and di-oleates;

3c. esters of cyclic polycarboxylic non-resinic acids, preferably esters of phthalic acid, esterified with aliphatic, preferably monohydric alcohols, and preferably the phthalates of aliphatic alcohols having at most 20 carbon atoms, or esterified with cyclic hydroxyl compounds, preferably the phthalates of cycloaliphatic preferably monohydric alcohols of 5 to 6 ring carbon atoms and those of preferably monohydric phenols.

D 4

Unsaturated fatty alcohols having from 12 to 20 carbon atoms.

D 5

Esters of ortho-phoshoric acid and of aliphatic, cycloaliphatic and aromatic alcohols.

D 6

Polypropylene-glycols of a molecular weight of from about 2,000 to 4,000, the solubility of which in water is less than 0.1g in 100 g of water at 25° C, for example the polyglycol "P 2000" and the polyglycol "P 4000" sold by DOW CHEMICAL COMPANY of Midland, Michigan, USA.

D 7

Soft polycarbamate resins (for example URESIN B, sold by HOECHST AG, Frankfurt-am-Main, Germany). Their viscosity preferably ranges from about 50 to 250 poises at 20° C.

D 8

Non-drying polyester (alkyd) resins obtained by esterifying a polybasic organic acid with a polyhydric alcohol in a molar ratio of about 1:1, affording resins of an acid number below 20 which are unmodified, and are soft and viscous (their viscosity in a 20%-isopropanol solution ranging from 5 to 200 centipoises, and from about 500 to 200 cP at 20° C when said resin is diluted in a weight ratio of 1:1 with butyl acetate).

D 9

Non-drying alkyd resins as defined under D 8, but modified with saturated or unsaturated fatty acids, especially such resin having a oil share of about 20 to 50%, preferably of castor oil, in the product.

D 10

Liquid triazines of the formula $$\begin{array}{c} R_1 \diagdown \phantom{xx} R_3 \diagdown \\ \phantom{xx} N \phantom{xxx} N \\ R_2 \diagup \phantom{x} \diagup \phantom{x} \diagdown \phantom{x} R_4 \\ \phantom{xx} N \phantom{xxx} N \\ \phantom{xxxx} \diagdown \phantom{x} \diagup \\ \phantom{xxxxx} Cl \end{array} \quad (V)$$

wherein each of $R_1$ and $R_3$, independently of the other, represents a hydrogen atom or a saturated and preferably aliphatic hydrocarbon radical having from one to 18 carbon atoms or a monocyclic aralkyl group in which the alkyl portion has at most 4 carbon atoms, or each of the pairs $R_1/R_2$ and $R_3/R_4$ taken together with the respective nitrogen atom to which it is linked, represents a group selected from pyrrolidino and piperazino, each of $R_1$ and $R_3$ preferably represents a hydrogen atom or an alkyl group of from 1 to 4 carbon atoms while each of $R_2$ and $R_2$ preferably represents an alkyl group of from 1 to 4 carbon atoms.

The silicone oil (C) which may constitute, or be present in, the liquid plasticizer (C) is preferably chosen from amongst dimethyl silicone oils, obtained by hydrolysis of dimethyl-chlorosilane and polymerisation, the viscosity of which, at 25° C, is between 20 and 2,000 cSt.

The general chemical structure of these silicone fluids corresponds to the formula $$-O-Si-O-\left[\begin{array}{c} CH_3 \\ | \\ Si-O \\ | \\ CH_3 \end{array}\right]_n \begin{array}{c} CH_3 \\ | \\ Si-O- \\ | \\ CH_3 \end{array} \quad (IV)$$

The secondary plasticiser (E) which must be solid, is either crystalline or waxy, and must be miscible or compatible with the liquid plasticiser; it is preferably chosen from amongst the commercially available products having a penetration index of 4 to 25 and belonging to one of the following classes:

E 1:

Esers of saturated organic monocarboxylic acids having 8 to 11 carbon atoms, and of monohydric alcohols having from 8 to 12 carbon atoms.

E 2:

Esters of aliphatic monocarboxylic non-resinous acids having from 8 to 24, and preferably from 10 to 20 carbon atoms, and monomeric polyhydric alcohols having at least 2 carbon atoms, and preferably from 2 to 12 hydroxyl groups; the alcohol moieties of these esters are preferably aliphatic.

E 3:

Aliphatic saturated monocarboxylic acids having at least 12 and preferably not more than 24 carbon atoms.

E 4:

Aliphatic dicarboxylic acids having from 6 to 12 carbon atoms.

E 5:

Fatty alcohols having from 12 to 22 carbon atoms and especially the fatty alcohols of which the hydrocarbon chain is saturated; within this group, tetradecyl or myristyl alcohols (C 14) and hexadecyl or cetyl alcohols (C 16) are preferred.

E 6:

Amines of the types $$R-NH_2, \quad \begin{array}{c} R \diagdown \\ \phantom{x} NH \\ R' \diagup \end{array} \text{ and } \begin{array}{c} R \diagdown \\ \phantom{x} N-R' \\ R'' \diagup \end{array}$$

(VI) \phantom{xxx} (VII) \phantom{xxx} (VII A)

wherein R, R' and R'', which may be identical or different, represent aliphatic hydrocarbon radicals containing from 7 to 24 carbon atoms.

E 7:

Esters of acids of the fatty series with at least 10 carbon atoms, preferably 12 to 24 carbon atoms, and of polyvinyl alcohols; the viscosity of these esters when hot, measured in accordance with the Ubbelohde method, is between about 300 and 500 cSt at 70° C, and between about 100 and 300 cSt at 100° C; these very soft esters must have an acid number less than 1 and a saponification number of zero, and the content of unsaponifiable matter must hence be 100%, otherwise especially their inherent hardness is too high.

E 8:

Polyethyleneglycols resulting from the polycondensation of ethylene oxide, and corresponding to the general formula: $HO - CH_2 - (CH_2 - O - CH_2)_n - CH_2OH$ wherein $n$ is greater than 3 and preferably between 4 and about 700.

E 9:

Monomeric polyhydric alcohols, having an uninterrupted linear or branched aliphatic, or alicyclic-aliphatic, or alicyclic chain, and preferably from 2 to 6 hydroxy groups, which alcohols have a melting point of at least 40° C and preferably above 50° C.

2,2-dihydroxymethyl-butan-1-ol and trimethylolpropane, having a melting point of 58° C are examples of such alcohols.

E 10:

Diesters of carbocyclic dicarboxylic acids having at least 7 carbon atoms and of cyclic or alicyclic-aliphatic monohydric alcohols, of which the melting point is preferably above 50° C, but below 80° C, and of which the molecular weight is below 1000. Dicyclohexyl phthalate, having a melting point of 64° C, is an example of these diesters.

E 11:

Diesters of carbocyclic dicarboxylic acids having at least 7 carbon atoms and of monohydric aliphatic alcohols having at least 8 carbon atoms, the molecular weight of which diesters is below 1000.

E 12:

Tris-amino-s-triazine compounds falling under the general formula

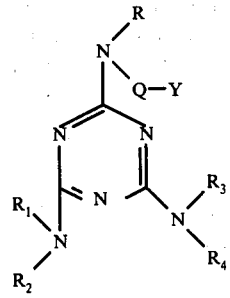

(VIII)

in which R, $R_1$ and $R_3$ independently of one another, each represent a hydrogen atom or an aliphatic hydrocarbon radical containing at most 20 carbon atoms and optionally carrying substituents as defined below, $R_2$ and $R_4$ each represent an aliphatic or cycloaliphatic hydrocarbon radical which carries optionally substituents selected from halogen and hydroxyl, but at least one of these two radicals is an aliphatic group containing from 10 to 22 carbon atoms, Q represents an alkylene or alkenylene radical preferably of from 2 to 20 carbon atoms, and Y represents a hydrophilic substituent selected from —OH, —COOH and —COO⁻ M⁺ wherein M⁺ represents a monovalent cation such as ammonium, sodium or potassium.

The aliphatic hydrocarbon radicals, optionally carrying substituents, which the symbols R, $R_1$ and $R_3$ in the general formula can represent, can be linear or branched alkyl or alkenyl radicals containing at most 20 carbon atoms and can for example carry substituents selected from hydroxyl groups and halogen atoms, such as for example fluorine or chlorine, as substituents.

The aliphatic or cycloaliphatic, optionally halogenated, hydrocarbon radicals which the symbols $R_1$ and $R_4$ can represent are, preferably, alkyl or alkenyl radicals having at most 20 carbon atoms and which can carry optionally one or more halogen atoms, preferably chlorine or fluorine atoms as substituents. At least one of the radicals $R_2$ and $R_4$ should contain from 10 to 20 carbon atoms so as to represent a lipophilic group. This lipophilic group can also be an ionogenic one of the type described above.

As hydrophilic substituents Y, there may be present ionogenic groups and, more in particular, acid substituents which generate anions as well as basic substituents which generate cations, but also groups which do not dissociate, such as for example, the groups —COOH, —SO₃H, —SO₂—NH₂, —SO₂NH—alkyl, —SO₂—N—(alkyl)₂, —SO₂—NH-(hydroxyalkyl), —SO₂—N(hydroxyalkyl)₂, —OH and primary, secondary and tertiary amino groups, such as NH₂, alkylamino and dialkylamino, amino-carboxy-carbonyl, hydroxyalkylamino and dihydroxyalkylamino. Alkyl substituents in the grouping Y have preferably at most 4 carbon atoms.

The alkylene or alkenylene radicals represented by Q in the general formula are preferably linear and can contain up to 20 carbon atoms.

E 13:

Tris-amino-s-triazine compounds corresponding to the general formula

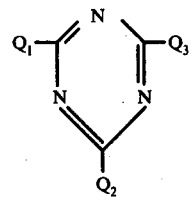

(IX)

wherein
$Q_1$ is the group

in which $R_1$ represents an alkyl radical containing from 1 to preferably not more than 5 carbon atoms and
$R_2$ represents an alkyl radical containing at most 22, and preferably from 10 to 22 carbon atoms, or a phenyl radical;

$Q_2$ represents
i. a chlorine atom; or
ii. the grouping

wherein $R_1$ and $R_2$ have the same meanings as in $Q_1$; or
iii. a grouping of the formula

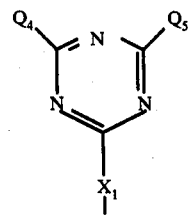

iv. a pyrrolidino, piperidino, 4-methyl-piperazino, morpholino or hexamethylene-imino radical;

$Q_3$ represents the grouping

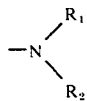

as defined hereinbefore, when $Q_2$ has the meaning (ii); or, when $Q_2$ has one of the meanings (i), (iii) and (iv), $Q_3$ represents either the grouping

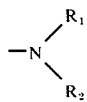

as defined hereinbefore, or a pyrrolidino, piperidino, 4-methylpiperazino, morpholino or hexamethylene-imino radical, each of $Q_4$ and $Q_5$ represent either the grouping

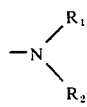

as defined hereinbefore, or a pyrrolidino, piperidino, 4-methylpiperazino, morpholino or hexamethylene-imino radical, and $X_1$ represents a divalent alkyl-imino bridge having at least 2 carbon atoms and at least 2 terminal imino groups each of which is linked to a different carbon atom of the alkyl bridge, or $X_1$ represents piperazine-1,4-di-yl.

E 14:

Compounds pertaining to the class of 2-guanidino-4,6-bis-amino-s-triazines and falling under the general formula

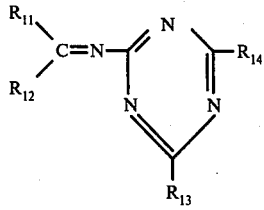

(X)

in which $R_{11}$, $R_{12}$, $R_{13}$ and $R_{14}$, independently of one another, each represent an amino group carrying one or two aliphatic radicals as substituents, or a saturated nitrogen-containing heterocyclic radical with 4 to 7 ring members, which may or may not carry substituents, and which can further contain oxygen or nitrogen as another hetero-atom and is bonded via an intracyclic nitrogen atom to the respective carbon atom of Formula X, or a salt derivative of such a triazine.

These compounds display similar properties to those of the waxes.

The aliphatic substituents carried by the amino groups $R_{11}$, $R_{12}$, $R_{13}$ or $R_{14}$ can be open-chain radicals or cyclic radicals or open-chain radicals carrying heterocyclic substituents.

The open-chain aliphatic substituents, of which at least one per molecule should preferably contain from 10 to 22 carbon atoms, are alkyl or alkenyl radicals with a straight or branched chain, possessing 1 to 22 carbon atoms. The aliphatic substituent R carried by a primary amino group R—NH— preferably has 6 to 22 carbon atoms, more particularly 10 to 22 carbon atoms, whilst, of the two open-chain radicals carried by a secondary amino group, it is preferred that one should be an alkyl or alkenyl radical with up to 6 carbon atoms and the other an alkyl or alkenyl radical with 6 to 22 carbon atoms.

These alkyl or alkenyl radicals may be unsubstituted or can carry one or more substituents taken from the group which comprises the —OH, —COOH, —COONa, —COOK, dialkylamino or trialkylammonium groups.

The aliphatic radicals with heterocyclic substituents of an amino group are preferably alkyl or alkenyl radicals carrying a morpholino radical.

As saturated nitrogen-containing heterocyclic structures bonded by an intracyclic nitrogen atom, cyclic systems with 5 to 7 ring members are preferred, and these can, in addition to nitrogen, comprise other hetero-atoms, such as oxygen and sulphur atoms as elements of the ring. As examples, pyrrolidine, piperidine, piperazine, the 1-allyl-piperazines, morpholine, thiomorpholine, as well as the hexahydroazepines and the hexahydrodiazepines may be mentioned. These heterocyclic structures may be free of substituents or carry one or more substituents, which are for example halogen, alkyl or halogenoalkyl radicals.

E 15:

Waxy amines corresponding to the general formula:

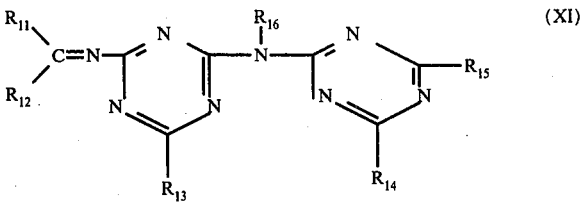

(XI)

in which $R_{11}$, $R_{12}$, $R_{13}$ and $R_{14}$ each, independently of one another, represent an amino group carrying one or two aliphatic radicals as substituents, or a saturated nitrogen-containing heterocyclic structure which may or may not carry substituents, which can additionally contain oxygen or nitrogen as a further hetero-atom, and which is bonded by an intracyclic nitrogen atom, $R_{15}$ represents the

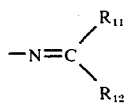

group, in which $R_{11}$ and $R_{12}$ have the meanings indicated above, or an amino group carrying one or two aliphatic radicals as substituents, or a saturated nitrogen-containing heterocyclic structure with 5 to 7 ring members, which may or may not carry substituents, which can further contain oxygen or nitrogen as a further hetero-atom and which is bonded via an intracyclic nitrogen atom, and $R_{16}$ represents a hydrogen atom or an alkyl radical with 1 to 4 carbon atoms.

E 16:

Triazine compounds of waxy consistency, corresponding to the general formula:

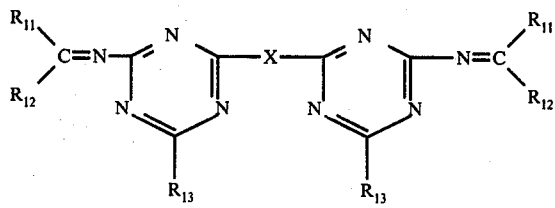

(XII)

in which $R_{11}$, $R_{12}$ and $R_{13}$ each, independently of one another, represent an amino group carrying one or two aliphatic radicals as substituents, or a saturated nitrogen-containing heterocyclic structure with 5 to 7 ring members, which may or may not carry substituents, which can further contain oxygen or nitrogen as a further hetero-atom and which is bonded by an intracyclic nitrogen atom, and X represents the divalent radical of a polybasic amine or of an at least dibasic nitrogen-containing heterocyclic structure, possessing at least two nuclear nitrogen atoms, the two triazine rings being bonded to different nuclear nitrogen atoms.

As aliphatic substituents carried by the amino groups $R_{11}$, $R_{12}$ and $R_{13}$, it is possible to envisage radicals with an open-chain or a cyclic chain, or aliphatic open-chain radicals which carry heterocyclic substituents. In the case of aliphatic open-chain substituents, the radicals are more particularly alkyl or alkenyl radicals with a straight or branched chain containing at most 22 carbon atoms.

If the aliphatic open-chain substituent is carried by a primary amino group, it preferably contains from 6 to 22 carbon atoms, more particularly from 10 to 22 carbon atoms, whilst in the case of two open-chain radicals carried by a secondary amino group, it is preferred that one of the radicals should be an alkyl or alkenyl radical with 1 to 6 carbon atoms and the other should be an alkyl or alkenyl radical with 6 to 22 carbon atoms.

These alkyl or alkenyl radicals can be devoid of substituents or can carry hydroxyl groups or halogen atoms, single or multiple substitution being acceptable.

As saturated nitrogen-containing heterocyclic substituents bonded via a nitrogen atom of the ring, cyclic systems with 5 to 7 ring members are preferably envisaged, and these can further contain other hetero-atoms, for example oxygen and sulphur atoms, as elements of the ring. Pyrrolidine, piperidine, piperazine, the 1-alkyl-piperazines, morpholine, thiomorpholine, as well as hexahydroazepine and hexahydrodiazepine groups may be quoted as examples.

These heterocyclic structures may be devoid of substituents, or carry one or more substituents, which are for example alkyl or halogenoalkyl radicals.

Radicals which form the bridge X are in particular radicals of aliphatic polyamines, for example the N,N' radicals of ethylenediamine, of hexamethylenediamine and of N,N-bis-(γ-aminopropyl)N'-methylamine, the radicals of aromatic or alicyclic polyamines, such as for example the radicals of phenylenediamines, of diaminodiphenylalkanes and of 1-amino-3-aminomethyl-cyclohexane, of heterocyclic polyamines, such as for example 2,6-diamino-pyridine, and also the radicals of at least dibasic saturated nitrogen-containing heterocyclic structures, such as for example the piperazine radical.

As regards the choice of the solid plasticiser, preference is generally given to the substances which contain hydrocarbon chains with 12 or more carbon atoms, especially those which belong to group E 5, and which after drying of the film or coating, are capable of crystallising finely within, and on the surface of, the latter.

It has, in effect, been found that this surface microcrystallisation (particle size, measured by the optical method, preferably between 1 and 15 microns) improved the silky nature of the film and allowed it to be more easily restored by means of a soft cloth or a polishing brush.

The volatile monohydric alcohol (F) used as the principal solvent is preferably ethanol, isopropanol or a mixture of both.

The volatile liquid organic co-solvent (G), which must, of course, be miscible with the volatile alcohol used as the primary solvent, is preferably chosen from amongst commercially available substances pertaining to the following chemical classes:

G 1:

Aliphatic, cycloaliphatic and cycloaliphatic-aliphatic alcohols comprising per molecule one or two hydroxyl groups and optionally at least one chain member which is selected from —O— and

The preferred alcohols of this class correspond to the formula $$R - A - OH \qquad (XIII)$$

in which R represents a hydrogen atom, or a hydroxyl group, or an alkoxy group of from 1 to 6 carbon atoms, or an alkoxy-alkoxy group of from 2 to 6 carbon atoms; and A represents a divalent hydrocarbon radical of straight or branched chain having preferably from 5 to 10 carbon atoms when R represents hydrogen, or when R has one of the other meanings given hereinbefore, the chain A has preferably from 2 to 6 carbon atoms.

G 2:

Terpene hydrocarbons, preferably terpenes $C_{10}H_{16}$, sesquiterpenes $C_{15}H_{24}$ and diterpenes $C_{20}H_{32}$.

G 3:

Aliphatic ketones free from either and hydroxyl groups and having preferably at least 6 carbon atoms.

The preferred compounds correspond to the formula:

(XIV)

in which R represents an alkyl radical of from 1 to 8 carbon atoms or an acetonyl or acetylenyl radical, and R' represents an alkyl radical containing from 1 to 6 carbon atoms.

G 4:

Alicyclic and aromatic ketones having at least 6 carbon atoms.

The preferred compounds correspond to one of the following general formulae:

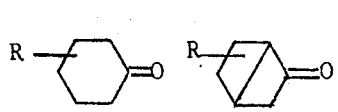 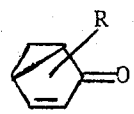 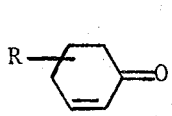 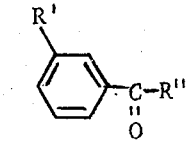 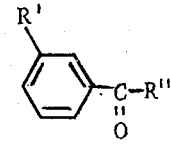

(XVa)    (XVb)    (XVc)    (XVd)    (XVe)

in which R represents hydrogen or from one to three alkyl groups of from 1 to 4 carbon atoms; R' represents hydrogen or from one to three groups selected from alkyl of from 1 to 6 carbon atoms and alkoxy from 1 to 4 carbon atoms; and R'' represents alkyl of from 1 to 6 carbon atoms. Such compounds are, e.g., cyclohexanone and methylcyclohexanones (XVa), thujone (XVb), umbellulone (XVc), isophorone (XVd) and acetophenone and methoxy-acetophenone (XVe).

G 5:

Aliphatic hydrocarbons having preferably a boiling point in the range from 80° to 160° C.

The preferred compounds contain from 6 to 12 carbon atoms as a straight or branched chain.

G 6:

Saturated cycloaliphatic and hydroaromatic hydrocarbons having from 6 to 10 carbon atoms, dicyclic ones being preferred, preferably dicyclic hydrocarbons having from 6 to 10 carbon atoms:
the total content of compounds falling under G-5 and G-6, present in the compositions according to the invention should not exceed a limit amount above which the mixture of compounds (F) and (G) would not be capable of dissolving the total amount of constituents (A), (B), (C), (D) and (E) present.

G 7:

Aliphatic halogenated hydrocarbons, preferably the compounds containing from 2 to 12 carbon atoms as a straight or branched chain, and from 1 to 6 halogen atoms, preferably chlorine.

G 8:

Aromatic halogenated hydrocarbons, corresponding to the general formula

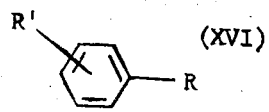
(XVI)

in which R represents a hydrogen atom or an alkyl radical having from 1 to 5 carbon atoms and R' represents one to three chlorine and/or bromine atoms.

A composition produced in accordance with the invention can furthermore contain about 0.01 to 5% of one or more supplementary substances chosen, for example, from amongst the following groups:
colourants (from 0.01 to 3%, preferably 0.05 to 2%),
ultraviolet radiation absorbers (0.05 to 5%),
perfumes,
insecticides,
bactericides, and
fungicides,
all in effective amounts which do not exceed 5%, fillers (0.01 to 3%, preferably less than 1%), in particular silica or alumina and, generally, inorganic compounds which can impart a waxy texture, pleasant to the touch, to the applied films, and
polytetrafluoroethylenes corresponding to the general formula

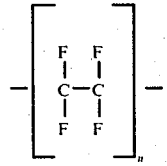

wherein $n$ is about 1000, and solid in the USA and in numerous other countries under the names "Teflon" and "Fluon" (0.1 to 3%, preferably less than 1%). The polytetrafluoroethylene is preferably used in the present compositions in the form of a very finely divided powder (the particle size, assessed by the optical method, is about 5 microns). Such a product is sold by Imperial Chemical Industries under the name "Fluon L 169".

Some examples of the compositions according to the invention are given below in order to illustrate and make more comprehensible the previous statements, without limitations being imposed thereby. In Examples 1 to 72, the amounts of constituents shown in the Tables are expressed in parts by weight.

The compositions which form the subject of the invention can be in the following forms:
Either a liquid form, which is applicable in the manner of a conventional liquid wax, for example by spreading on the floor by means of a cloth;
or enclosed in a container of the aerosol bomb type, in which case a dispersing agent which is gaseous at ambient temperature and pressure is added;
or even concentrated, so as to be reduced to a pasty form, and hence used like an ordinary paste polish;
or in a gelled form.
They can also be introduced into any applicator device.

In each case, the composition is easy to apply because the parquet floor is glossy as soon as the film has dried; it is unnecessary to polish.

The characteristics and properties peculiar to the compositions of the invention have been demonstrated in the course of experiments described below which have allowed these compounds to be compared with known polishing products. They show that the compositions according to the invention are totally different from liquid waxes and from varnishes.

They differ from liquid waxes by their ability to give an immediate gloss without being rubbed, through their hardness and abrasion resistance, by their long life and by their resistance to staining and to wiping with a wet cloth.

They differ from varnishes by their capacity for being easily applied with a cloth to waxy surfaces and of being restorable to proper condition.

After the application of a composition of the invention on a surface to be treated, for instance on a wooden parquet floor, the solvents, i.e. constituents (F) and (G), of the composition evaporate rapidly and leave a glossy film on the surface, which film possesses the above-described advantageous properties.

The film obtained with the preferred compositions of the invention resists even a quick cleaning with aqueous soap solutions.

The following non-limiting experiments and examples serve to illustrate the invention.

COMPARATIVE EXPERIMENTS AND WORKING EXAMPLES

EXPERIMENT 1

The gloss of the surface was measured before and after application and then after polishing, after a second application, after a second polishing, after a third application and after a third polishing; in the case of the new product, no polishing was carried out after application.

In each case, the gloss was measured by means of a photo-electric glossmeter of the "Bruno Lange" type, which is known for objectively measuring the sparkle reflected by the surfaces.

The product described in Example No 1, given below, was thus compared with nine waxes most widely sold on the French market.

| | | GLOSS | | | | | |
|---|---|---|---|---|---|---|---|
| | Initially | After 1st application | After polishing | After 2nd application | After polishing | After 3rd application | After polishing |
| WAX A | 10 | 11 | 28 | 13 | 32 | 15 | 36 |
| WAX B | 11 | 12 | 16 | 12 | 17 | 13 | 16 |
| WAX C | 10 | 7 | 13 | 6 | 17 | 6 | 17 |
| WAX D | 10 | 8 | 17 | 7 | 19 | 9 | 23 |
| WAX E | 10 | 11 | 15 | 12 | 16 | 12 | 16 |
| WAX F | 11 | 12 | 14 | 13 | 14 | 13 | 15 |
| WAX G | 10 | 11 | 13 | 12 | 16 | 12 | 16 |
| WAX H | 10 | 12 | 15 | 12 | 20 | 13 | 20 |
| WAX I | 11 | 13 | 20 | 14 | 26 | 15 | 26 |
| Product of our example No. 1 | 10 | 45 | 45 no polishing | 53 | 53 no polishing | 56 | 56 no polishing |

The waxes A to I are liquid waxes containing solvents, their solids content and their penetration number being as follows:

| Wax | Solids content (%) | Penetration Number |
|---|---|---|
| A | 10 | 30 |
| B | 20 | 47 |
| C | 16 | 34 |
| D | 11 | 23 |
| E | 14 | 21 |
| F | 8.5 | 20 |
| G | 12 | 32 |
| H | 19 | 57 |
| I | 12 | 16 |

EXPERIMENT 2

The hardnesses and the abrasion resistance of two compositions of the invention were compared with those of liquid waxes.

Sheets of glass of size 200 × 100 × 3mm were used as the support for the SWARD and PERSOZ hardnesses, and mild steel sheets of size 150 × 30 × 1 mm were used as the support for the determination of the abrasion resistance.

The results obtained are shown in the table below. They show that the hardness and the abrasion resistance of the films originating from the use of the compositions of the invention are markedly higher than those of the films originating from known waxes.

| | Thickness of the film | SWARD hardness | PERSOZ hardness | Abrasion (French standard specification T 30 - 015; rubbing shoe method) |
|---|---|---|---|---|
| WAX A | 20 μ | 4 | 25'' | not measurable (film destroyed |
| WAX B | 20 μ | 2 | 11' | '' |
| WAX C | 20 μ | 2 | 17½'' | '' |
| WAX D | 20 μ | 4 | 20'' | '' |

-continued

| | | | | |
|---|---|---|---|---|
| WAX J | 20 μ | 4 | 21" | " |
| WAX H | 20 μ | 5 | 23" | " |
| Liquid product of example 2 | 20 μ | 55 | 4'20" | 17.A.R |
| Aerosol product of example 10 | 20 μ | 52 | 4'40" | 19.A.R. |

The waxes A, B, C, D and H are those of experiment 1. The wax J is a liquid wax containing solvents, with 16 % solids content and a penetration number of 18.

EXPERIMENT 3

In this, the resistance to traffic of surfaces treated with known conventional waxes for parquet floors and of surfaces treated by the compositions of the invention was compared.

The gloss was measured on the photoelectric glossmeter of the "Bruno Lange" type. The results obtained are shown in the table below. It is seen that, contrary to the compositions of the invention, the conventional waxes rapidly lose their gloss; the varnish used preserves its gloss but numerous blisters are observed, which is not the case with the compositions of the invention.

The measurements were carried out on the Bruno Lange photoelectric glossmeter. The samples used originated from an old oak parquet floor maintained with a conventional liquid polish.

The applications were made at the rate of 20 g per m² for the known waxes and 15 g per m² for the products of the invention.

The results observed are given in the table below.

It is seen that wiping removes the greater part of the gloss of the surfaces treated with the conventional waxes whilst the surfaces treated with the compositions produced according to the invention retain their entire sparkle.

| | GLOSS | | | |
|---|---|---|---|---|
| | Before treatment | After application | After polishing | After wiping with a wet cloth and drying |

| | Initial gloss of the already waxed parquet floor (oak parquet floor) | Gloss after applying 3 layers of product (15 g/m²) and polishing | Gloss after 1 month of intense traffic (*) | Gloss after 2 months of intense traffic (*) | Appearance of the parquet floor after 1 month |
|---|---|---|---|---|---|
| WAX G | 14 | 53 | 36 | 21 | Gloss greatly reduced |
| WAX K | 16 | 41 | 24 | 20 | Dull zones |
| Catalysable varnish for parquet floors, of 50% solids content | 16 | 71 No polishing | 70 Numerous blisters from footmarks | 69 Very numerous zones showing crackling | Very numerous blisters, experiment impossible to continue |
| Catalysable varnish for parquet floors with 40% solids content | 15 | 65 | 61 Numerous points of detachment due to footmarks | 60 Very numerous blistering zones | The varnish detaches. The test cannot be continued |
| Liquid product of example 3 | 14 | 68 No polishing | 65 | 60 | Glossy |
| Aerosol product of example 11 | 16 | 76 No polishing | 75 | 65 | Gloss well preserved |

(*)parquet floor solely maintained by daily shining with a woollen cloth. No fresh application was carried out throughout the duration of the walking tests.
The wax C is the liquid wax mentioned in the experiments 1 and 2 and the wax K is an aerosol wax, containing 30% of solids and having a penetration number of 129.

EXPERIMENT 4

The behaviour, when wiped with a wet cloth, of conventional waxes and of compositions forming the subject of the present invention was here examined.

| | | | | |
|---|---|---|---|---|
| WAX A | 19 | 11 | 30 | 12 |
| WAX B | 19 | 10 | 26 | 11 |
| WAX C | 19 | 12 | 22 | 13 |
| WAX D | 19 | 11 | 20 | 13 |
| Product of exam- | | | | |

-continued

| | GLOSS | | | |
|---|---|---|---|---|
| | Before treatment | After application | After polishing | After wiping with a wet cloth and drying |
| ple 8 | 19 | 43 | (*) | 41 |
| WAX L | 19 | 13 | 29 | 8 |
| Aerosol product of example 12 | 19 | 51 | (*) | 49 |

(*)No polishing was carried out after application (immediate gloss).
Waxes A, B and D: liquid waxes mentioned in experiments 1 and 2.
Wax C: liquid wax mentioned in experiments 1, 2 and 3.
Wax L: aerosol wax of 12% solids content, having a penetration number of 31.

EXPERIMENT 5

Herein, the effect of various stains on conventional polishes and on compositions of the invention was examined.

Rubbed-down oak specimens were used. The product was applied in layers at the rate of 15 g per m² and then dried (after the 1st and 2nd layer) for 30 minutes. The duration of drying after the 3rd layer and before the application of the stains was 4 hours.

The stains were made with 0.5 g of each substance, spread over a circle of 5 cm diameter.

The stains were allowed to dry and age for 20 hours before being removed.

The results, measured with the Bruno Lange glossmeter, are grouped together in the table below. It is seen that the effect of the various stains on the surfaces treated with the composition produced according to the invention is very much less than on the surfaces treated with conventional waxes.

In effect, after the experiment the gloss is reduced by 14 to 69 % in the case of the conventional waxes and only by 6 to 16 % in the case of the new composition.

| | | GLOSS | | | | | |
|---|---|---|---|---|---|---|---|
| | Of the specimen before waxing | After application of 3 layers of product, followed by drying and polishing | After removing the stains with a moist cloth and drying with a woollen cloth Nature of the stain | | | | |
| | | | Water | Coffee | 8°Vinegar | Champagne | Whisky | Milk |
| WAX A | 10 | 27 | 14 | 13 | 12 | 13 | 12 | 9 |
| WAX B | 10 | 21 | 14 | 18 | 16 | 10 | 14 | 8 |
| WAX C | 10 | 19 | 9 | 11 | 12 | 11 | 10 | 11 |
| WAX D | 10 | 21 | 11 | 12 | 13 | 12 | 11 | 12 |
| WAX M | 10 | 29 | 15 | 13 | 11 | 12 | 9 | 11 |
| WAX N | 10 | 25 | 17 | 16 | 17 | 19 | 18 | 20 |
| Product of example 2 | 10 | 66(*) | 62 | 60 | 58 | 61 | 55 | 59 |

(*)No polishing after application.
Waxes A, B, C and D: liquid waxes mentioned in the preceding experiments.
Wax M: liquid wax containing solvents and with 14% solids content, the latter having a penetration number of 20.
Wax N: liquid wax containing solvents and silicones, of 10% solids content, the latter having a penetration number of 16.

EXPERIMENT 6

In this experiment, the capacity for re-polishing of the conventional waxes, of the varnishes for parquet floors and of the compositions produced according to the invention was studied.

Rubbed-down specimens of oak, of size 150 × 70 × 5 mm were used, and the gloss was measured on the Bruno Lange glossmeter. The wear was effected by means of the abrasion resistance test apparatus according to French standared specification AFNOR T 30-015. The principle of this apparatus is to wear down a film of the product to be tested by means of an abrasive cloth subjected to a reciprocating movement and exerting a certain pressure on the film.

For the experiments considered here, the strip of emery cloth of commercial grade 0 was replaced by a strip of emery cloth of commercial grade 240, sold under the trademark VORAX by Messrs. MINNESOTA DE FRANCE. Further, the wear of the film was not continued until the support surface appeared; it was restricted to 50 reciprocating movements of the abrasive cloth fixed to the 500 g shoe.

Results obtained are recorded in the table below.

This experiment strikingly shows the difference between the compositions produced according to the present invention and the varnishes.

In effect, the wear marks caused on the varnish films cannot be removed by polishing whilst for the new compositions the wear marks can thus be removed.

| | | GLOSS | | | |
|---|---|---|---|---|---|
| | Untreated specimen | After application of 2 layers of product (30 g/m² per layer) | After polishing | After wear (50 A-R) | After re-polishing |
| WAX A | 14 | 9 | 32 | 14 | 32 |
| WAX B | 14 | 9.5 | 22 | 8 | 24 |
| WAX C | 14 | 10 | 31 | 9 | 32 |
| WAX D | 14 | 12 | 28 | 11 | 28 |
| WAX O | 14 | 13 | 27 | 11 | 27 |
| WAX L | 14 | 15 | 36 | 13 | 35 |
| Varnish for parquet floors, with 50% solids content | 14 | 95 | (*) | 20 | 20 |
| Product of example 1, in a tin | 14 | 88 | (*) | 43 | 87 |
| Aerosol product of example 14 | 14 | 86 | (*) | 45 | 84 |

(*)No polishing was carried out after treatment.
Waxes A, B, C and D: liquid waxes mentioned in the preceding experiments.
Wax L: aerosol wax mentioned in experiment 4.
Wax O: liquid wax with 11.5% solids content, the latter with a penetration number of 24.

The preceding experiments show clearly the considerable differences existing between the known waxes and varnishes on the one hand, and the compositions according to the invention on the other; the properties are always in favour of the products produced according to the invention.

These differences can be summarised as follows:

1. The waxes have to be polished vigorously in order to shine, whilst the new compositions shine instantly on drying.
2. Waxes are fragile and are not abrasion-resistant, whilst the new compositions provide good strength.
3. The waxes have little durability to traffic and hence require repeated maintenance, whilst the new compositions only require very brief maintenance and especially very widely spaced fresh applications.
4. The waxes have very little resistance to stains and to wiping with a wet cloth, whilst the new compositions show little sensnitivity to stains and stand up very well to wiping with a wet cloth.
5. The varnishes do not adhere to waxy surfaces, whilst the new compositions suitably anchor thereto.
6. Scratches produced on the surface of the varnishes cannot be rectified at all, whilst marks and scratches can be rectified in the case of the compositions according to the present invention.

In the following non-limitative examples, amounts of constituents are given in parts by weight unless expressly stated otherwise.

EXAMPLES 1 – 8:

Gloss-imparting agents for parquet floors, usable as liquids. (Details about the constituents designated by (a) to (aw) are given further below).

| Components | Type | Detail | 1 | 2 | 3 | 4 | 5 | 6 | 7 | 8 |
|---|---|---|---|---|---|---|---|---|---|---|
| Cellulose aceto-butyrate | $A_1$ | (a) | 8 | 8 | | | 8 | 7 | 10 | 4 |
| Ethyl cellulose | $A_3$ | (v) | | | | 4 | | | | |
| Polyvinyl-acetate | $A_5$ | (b) | | | 4 | | | | | |
| Poly-(methylmethacrylate) (Tukon hardness ca. 7) | $A_9$ | (c) | | | | | 5 | | | 4 |
| Cyclo-hexanone-formaldehyde resin | $B_1$ | (d) | 5.5 | 5.5 | 5.5 | | | 5 | 8 | |
| Poly-(butylmethacrylate) (Tukon hardness ca. 12) | $B_2$ | (e) | | | | | | | | 4 |
| Abieto-fumaric acid resin | $B_3$ | (f) | | | | 4 | | | | |
| Melamine resin | $B_6$ | (g) | | | | | 6 | | | |
| Silicone oil 250 cST | C | (h) | 1 | 0.5 | 2.5 | 0.1 | 0.2 | 0.1 | 0.3 | 0.5 |
| Colophaendiethylene-glycol soft resin | $D_2$ | (i) | 8 | 8 | 8 | 6.5 | 8 | | 12 | 3.5 |
| Sucrose aceto-butyrate | $D_{3a}$ | (k) | | | | 7 | | | 8 | |
| Carbamic soft resin | $D_7$ | (j) | | | | | 5 | 9 | | 6 |
| Hexyl-dodecanol | $E_5$ | | 2 | 2 | 2 | | 2 | | | |
| Octyl-dodecanol | $E_5$ | | | | | 1 | | 2 | | |
| Dicyclohexyl phthalate | $E_{10}$ | | | | | | 8 | 5 | | |
| Triazine | $E_{12}$ | (l) | | | | | | 4 | | |
| Triazine | $E_{12}$ | (l') | | | | | | | 3 | |
| Triazine | $E_{12}$ | (l'') | | | | | | | | 2.5 |
| Ethanol | F | | 35.75 | 35.75 | 35 | | 48 | 40.9 | | |
| Isopropanol | F | | | | | 63.5 | | | 40 | 64 |
| 1-Ethoxy-2-hydroxy-ethane | $G_1$ | | 34.75 | 34.75 | 34 | | 9.8 | 17 | | |
| 1-Methoxy-2-hydroxy-ethane | $G_1$ | | | | | 12.9 | | | 15.7 | 15.5 |
| Dipentene | $G_2$ | | 5 | 5 | 5 | | 5 | 10 | | |
| Adjuvant: Poly-tetra-fluoro-ethylene in powder form (Teflon) | | | | | 0.5 | | | | | |

Gloss-imparting agents for use in aerosol dispensers.

| Concentrate | Type | Detail | Examples 9 A | 10 B | 11 C | 12 D | 13 E | 14 F |
|---|---|---|---|---|---|---|---|---|
| Cellulose aceto-butyrate | $A_1$ | (a) | | | | | 5 | |
| Hydroxy-propyl cellulose | $A_3$ | (m) | | | | 6 | | |
| Poly-(isobutyl methactylate) (Tukon hardness ca. 8) | $A_9$ | (n) | 5 | | 4 | | | |
| Poly-(butyl methacrylate) (Tukon hardness ca. 8) | $A_9$ | (c) | | 5 | | | | 5 |
| Cetonic resin | $B_1$ | (d) | 3 | 4 | | 4 | | 4 |
| Poly-(butyl methacrylate (Tukon hardness ca. 12) | $B_2$ | (e) | | | | | 3 | |
| Abieto-fumaric acid resin M.P. 130° C | $B_3$ | (f) | 1 | | | | | |
| Terpene-phenolic resin M.P. 117–130° C | $B_3$ | (o) | | | 3 | | | |
| Silicone oil 250 cST at 25° C | C | (p) | 1 | 0.1 | 0.5 | 1 | 2 | 0.1 |
| Colophane-polyol soft resin | $D_2$ | (i) | | | | 6 | | |
| Sucrose aceto-butyrate | $D_3$ | (k) | | 7 | 9 | | | 7 |
| Dimethylcyclo-hexyl phthalate | $D_{3e}$ | | | | | | 6 | |
| Non-drying alkyd resin | $D_9$ | (q) | | | | | 5 | |
| Carbamic soft resin | $D_7$ | (j) | | | | 6 | | |
| Hydrogenated Castor oil M.P. 85.5° C | $E_2$ | | | | 1 | | | |
| Hexyl-dodecanol | $E_5$ | | 0.5 | 1 | | | | 1 |
| Octyl-dodecanol | $E_5$ | | 0.5 | | | 2 | 1 | |
| Triazine | $E_{12}$ | (l) | 7 | | | | | |
| Ethanol | F | | | | | 49 | | |
| Isopropanol | F | | 70 | 67 | 75 | | 53 | 66 |
| 2-Isopropoxy-ethanol | $G_1$ | | | | | 11 | | |
| 1-Methoxy-2-hydroxy-ethane | $G_1$ | | | | | | 15 | |
| Terpineol (distilling range 210–215° C) | $G_1$ | | | | | 5 | | |
| Acetone | $G_3$ | | 1 | 1 | | | | 1 |
| Methyl isobutyl ketone | $G_3$ | | | 1.5 | | | | 1.5 |
| Decahydro-naphthalene | $G_6$ | | | 5 | | | | 5 |
| Chloroform | $G_7$ | | 10 | | | | | |
| Methyl dichloride | $G_7$ | | | 7.4 | | | 10 | 7.4 |
| 1,2-Dichloro-propane | $G_7$ | | | | 7.5 | 10 | | |
| Adjuvant: Isopropyl acetate | | | 1 | 1 | | | | 1 |

| b) AEROSOLS | Example 9 | 10 | 11 | 12 | 13 | 14 |
|---|---|---|---|---|---|---|
| Concentrated product A | 40 | | | | | |
| Concentrated product B | | 65 | | | | |
| Concentrated product C | | | 50 | | | |
| Concentrated product D | | | | 70 | | |
| Concentrated product E | | | | | 75 | |
| Concentrated product F | | | | | | 65 |
| Propellant gas | 60 | 35 | 50 | 30 | 25 | 35 |

As the propellant gas, a liquefied gas or a mixture of liquefied gasses having a boiling point of between 0° C and −45° C can advantageously be used.

Here, the following are preferred:

| | Boiling point |
|---|---|
| chlorodifluoromethane (F 22) | 40.8° C |
| dichlorodifluoromethane (F12) | 27.8° C |
| Propane | 42.2° C |
| isobutane | 11.7° C |
| isobutylene | 6° C |
| butane | 0.5° C |
| methyl ether | 23.7° C |
| vinyl chloride | 14° C |

Of course all the information on concentrations, materials, ratios of mixtures, presentations and methods of use given above are given by way of examples which are in no way limiting, and variants, improvements in detail, and the use of equivalent means can be conceived without thereby going outside the scope of the invention.

In particular, numerous variants may be introduced in order to satisfy particular requirements or to produce related polishing products which are applicable to other waxed surfaces than wooden parquet floors.

Thus, for example, the said compositions may be applied to the production of self-polishing products for the care of furniture, shoes and leather articles, and, in general terms, for the polishing and care of surfaces which can be waxed.

The examples below indicate some of the possible applications of the invention for the maintenance of such surfaces.

EXAMPLES 15 – 17:

Furniture care products

|  | Type | Detail | 15 | Examples 16 | 17 |
|---|---|---|---|---|---|
| Cellulose acetobutyrate | $A_1$ | (a) | 8 | | |
| Cellulose acetobutyrate (1/10") | $A_1$ | (a') | | 7 | |
| Poly-(isobutyl methacrylate) (Tukon hardness ca. 8) | $A_{10}$ | (n) | | | 7 |
| Cyclohexanone-formaldehyde resin | $B_1$ | (d) | | | 5 |
| Phthalic resin, pure | $B_4$ | (r) | | 5 | |
| Melamine resin | $B_8$ | (g) | 5.5 | | |
| Silicone oil 200 cSt | C | (p) | 0.5 | 0.5 | 0.5 |
| Sucrose acetoisobutyrate | $D_3$ | (k') | | | 10 |
| Alkyl resin modified by non-drying fatty acids and containing 23% of the latter and 31% of phthalic anhydride | $D_9$ | (s) | 9 | 9 | |
| Carbamic soft resin | $D_7$ | (j) | 8 | | |
| Hexyl dodecanol | $E_5$ | | | | 1.5 |
| Polyvinyl stearate* | $E_7$ | | | 1.5 | |
| Triazine | $E_{13}$ | (u) | 2 | | 4 |
| Ethanol | F | | 45 | | |
| Isopropanol | F | | | 50 | 62 |
| 1-Ethoxy-2-hydroxy-ethane | $G_1$ | | 16 | 27 | 10 |
| Dipentene | $G_2$ | | 7 | | |

*In Example 16, polyvinyl stearate can be replaced by an equal amount of polyvinyl oleate.

These products can be used as such, in the manner of an ordinary liquid wax. They can easily be packaged in an aerosol bomb; in this case it suffices to add a sufficient amount of propellant gas to them, for example 30 parts by weight of propellant gas per 70 parts by weight of one of the compositions defined above.

EXAMPLES 18 – 20:

Coloured products for care of shoes and the like leather articles.

|  | Type | Detail | 18 | Examples 19 | 20 |
|---|---|---|---|---|---|
| Cellulose acetobutyrate, ½ second | $A_1$ | (a") | 6 | | |
| Ethyl cellulose | $A_3$ | (v) | | | 5 |
| Poly-(propyl methacrylate) (Tukon hardness 7-8) | $A_9$ | (w) | | 5 | |
| Ketonic resin | $B_1$ | (d) | 4 | 4 | 2 |
| Silicone oil 250 cSt | C | (h) | 0.1 | 0.1 | 0.2 |
| Soft resin from resine acids condensed with diethylene glycol | $D_2$ | (x) | 4 | | |
| Sucrose aceto-isobutyrate | $D_{3a}$ | (k') | | 7 | |
| Dimethyl-cyclohexyl phthalate | $D_{3c}$ | | | | 6 |
| Cis-9-octadecen-1-ol | $D_4$ | | 1 | | |
| Polypropylene glycol | $D_6$ | (y) | 5 | 0.2 | |
| Carbamic soft resin | $D_7$ | (j) | 3 | 4 | |
| fully hydrogenated copra fatty acids | $E_3$ | | | | 1 |
| Hexyl dodecanol | $E_5$ | | | 1 | |
| Triazine | $E_{12}$ | (1") | 2 | | |
| Triazine | $E_{14}$ | (z) | | | 3 |
| Isopropanol | F | | 49 | 65 | |
| Ethanol | F | | | | 56.8 |
| 2-Isopropoxy-ethanol | $G_1$ | | 19.9 | | |
| Diacetone alcohol $CH_3-\underset{CH_3}{\overset{OH}{C}}-CH_2-CO-CH_3$ | $G_1$ | | | 12.7 | |
| 1-Methoxy-2-hydroxy-ethane | $G_1$ | | | | 25 |
| Terpentine oil | $G_2$ | | 5 | | |
| Adjuvant: Deep Black Sudan BB | | (aa) | 1 | | |
| Zapon Fast Brown BE | | (ab) | | 1 | |
| Black HB | | (ac) | | | |

(aa)  
(ab) } Manufactured by BASF, Ludwigshafen, Germany  
(ac) Manufactured by Farbwerke Hoechst, Frankfurt, Germany

| Component | Type | Detail | 21 | 22 | 23 | Examples 24 | 25 | 26 | 27 |
|---|---|---|---|---|---|---|---|---|---|
| Cellulose acetobutyrate | $A_1$ | (a) | | | 9 | | | | 5 |
| Nitrocellulose | $A_2$ | | 8 | | | | | | |
| Polyvinyl acetate | $A_4$ | (b) | | 8 | | | | | |
| Modified phenoplast resin | $A_6$ | (ad) | | | | 14 | | | |

-continued

| Component | Type | Detail | 21 | 22 | 23 | Examples 24 | 25 | 26 | 27 |
|---|---|---|---|---|---|---|---|---|---|
| Modified aminoplast resin | A | (ae) | | | | | 6 | | |
| Modified aminoplast resin | A | (af) | | | | | | 5.5 | |
| Ketonic resin | $B_1$ | (d) | 5.5 | 5.5 | | 1.0 | 11.0 | 11.0 | |
| Phenolic resin, pure | $B_5$ | (ag) | | | | | | | 10 |
| Silicone oil 100 cSt at 25° C | C | (ah) | | | | 0.1 | 0.1 | 0.1 | |
| Silicone oil 25 cSt at 25° C | C | (ai) | | | 0.1 | | | | 0.1 |
| Colophane/diethylene glycol soft resin | $D_2$ | (i) | 8 | 8 | | 10 | 3.65 | 3.65 | |
| Decyl oleate | $D_{3a}$ | | | | | | | | 0.3 |
| Non-drying alkyd resin modified with castor oil | $D_9$ | (aj) | | | 9 | | | | |
| Cetyl alcohol | $E_5$ | | 2 | 2 | 1.9 | 1.9 | 0.25 | 0.25 | 0.5 |
| Ethanol | F | | 35.75 | 35.75 | 40 | 38 | 40 | | 41.6 |
| Isopropanol | F | | | | | | | 44.5 | |
| 1-Isopropoxy-2-hydroxy-ethane | $G_1$ | | | | | | | 35 | |
| Ethoxy-ethanol | $G_1$ | | 35.75 | 35.75 | 40 | 35 | 39 | | 35 |
| Dipentene (limonene) | $G_2$ | | 5 | 5 | | | | | |
| Acetone | $G_3$ | | | | | | | | 4.5 |

| | Type | Details | 28 | 29 | 30 | Examples 31 | 32 | 33 | 34 |
|---|---|---|---|---|---|---|---|---|---|
| Cellulose acetobutyrate | $A_1$ | (a) | | | 8 | 8 | 10 | 10 | |
| Polyalkylene polyamide | $A_8$ | (ak) | 7.5 | | | | | | |
| Poly-(isobutyl methacrylate) | $A_9$ | (n) | | | | | | | 10 |
| Tukon hardness ca. 8 | $A_{10}$ | | | 8 | | | | | |
| Colophone (grade WW) | | | | | | | | | |
| Ketonic resin | $B_1$ | (d) | 4 | 5.5 | | | 5 | 6 | 8.9 |
| Unmodified urea formaldehyde resin | $B_7$ | (al) | | | 5.4 | | | | |
| Styrene-maleic anhydride copolymer resin | $B_8$ | (am) | | | | 5.5 | | | |
| Silicone oil 1000 cSt at 25° C | C | (an) | 0.1 | | | | | | |
| Silicone oil 250 cSt at 25° C | C | (h) | | | | | | | 0.1 |
| Silicone oil 100 cSt at 25° C | C | (ah) | | | | | 0.1 | 0.1 | |
| Colophane-polyol soft resin | $D_2$ | (i) | 7 | 8 | 8 | 8 | | | 7 |
| Dioctyl sebacate | $D_4$ | | | | | | 8 | | |
| Didecyl phthalate | $D_{3c}$ | | | | | | | 9 | |
| Cetyl alcohol | $E_5$ | | 2 | 2 | 2 | 2 | 2 | 2 | 1 |
| Ethanol | F | | | 35.75 | 37.6 | 35.75 | | | |
| Isopropanol | F | | 57.4 | | | | 48 | 40 | 51.1 |
| 1-Methoxy-2-hydroxy-ethane | $G_1$ | | | | | | | | 14.9 |
| 2-Ethoxy-2-hydroxy-ethane | $G_1$ | | 22 | 35.75 | 34 | 35.75 | 19.9 | 26.9 | |
| Diethylene glycol | $G_1$ | | | | | | | | 7 |

| | Type | Details | 35 | 36 | Examples 37 | 38 | 39 | 40 | 41 | 42 |
|---|---|---|---|---|---|---|---|---|---|---|
| Cellulose aceto-butyrate | $A_1$ | (a) | 11 | 6 | 9 | 6 | 8 | 6 | 9 | 8 |
| Ketonic resin | $B_1$ | (d) | 5 | 4 | 1 | 4 | 5.5 | 4 | 6 | 5 |
| Silicone oil 100 | C | (ah) | 0.1 | 0.2 | | | | | | |

-continued

| | Type | Details | Examples 35 | 36 | 37 | 38 | 39 | 40 | 41 | 42 |
|---|---|---|---|---|---|---|---|---|---|---|
| Silicone oil 200 cSt at 25° C | | (p) | | | 0.25 | | | | 0.1 | |
| Silicone oil 1000 cSt at 25° C | * | (an) | | | | | | | | 0.1 |
| Silicone oil 25 cSt at 25° C | | (ai) | | | | 0.5 | | | | |
| Soft resin condensed from natural resinic acids and diethylene glycol | $D_2$ | (x) | | | | | 8 | | 9 | 8 |
| Glycerol mono-oleate | D 3b | | 4.5 | | | | | | | |
| Glycerol dioleate | D 3b | | 4.5 | | | | | | | |
| Refined castor oil | D 3b | | | 5 | | | | | | |
| Non-drying unmodified alkyd resin | D 8 | (ao) | | | 6 | | | 6 | | |
| Refined copra M.P. 26° C | $E_2$ | | | 0.5 | | | | | | |
| butyrate of 1,4-butane diol | $E_2$ | | | | | | | | | 2 |
| Glycerol monolaurate | $E_2$ | | | | 0.75 | | 2 | | | |
| Lauric acid | $E_3$ | | | | | | | | 1 | |
| Adipic acid | $E_4$ | | | | | 1.5 | | | | |
| Cetyl alcohol | $E_5$ | | 2 | | | | | | | |
| Monostearyl amine | $E_6$ | | | | | | | | 1 | |
| Ethanol | F | | | | 70 | 40 | 65 | | 45 | 35 | 50 |
| Isopropanol | F | | 40 | | | | 35.75 | | | |
| Ethoxyethanol | $G_1$ | | 28.9 | 14.3 | 43 | | 35.75 | 38 | 35 | 19.9 |
| Dipentene | $G_2$ | | 4 | | | | 5 | | 4.9 | 7 |
| Methyl cyclohexanone | $G_4$ | | | | | 5 | | | | |
| Trimethylcyclohexanone | $G_4$ | | | | | | 12 | | | |

*In lieu of silicone oil 1000 cSt it is also possible to use a silicone oil having at an ambient temperature of 25° C, a viscosity of 60,000 centistokes, a flashpoint of 316° C, a density of 0.973 g/ml, a refraction index of 1.4035 and a surface tension of 21.5 dynes/cm.

| | Type | Details | Examples 43 | 44 | 45 | 46 | 47 | 48 |
|---|---|---|---|---|---|---|---|---|
| Cellulose acetobutyrate | $A_1$ | (a) | 10 | 8 | 8 | 9 | 10 | 5 |
| Ketonic resin | $B_1$ | (d) | 7 | 6 | 6 | 5 | 5 | |
| Unmodified phenol-formaldehyde resin | $B_5$ | (au) | | | | | | 10 |
| Silicone oil 100 cSt at 25° C | C | (ah) | | | | | 0.1 | 0.1 |
| Silicone oil 1000 cSt at 25° C | C | (an) | 0.1 | | | 0.1 | | |
| Soft resin from natural resinic acids condensed with polyol | $D_2$ | (x) | 10 | 8 | 8 | 7 | 8 | |
| Decyl oleate | $D_{3a}$ | | | | | | | 0.3 |
| Non-drying alkyd resin modified with castor oil | $D_9$ | (aj) | | | | | | 3 |

-continued

| | Type | Details | \multicolumn{6}{c}{Examples} |
| | | | 43 | 44 | 45 | 46 | 47 | 48 |
|---|---|---|---|---|---|---|---|---|
| Cetyl alcohol | E | | | 1.5 | 1 | 1 | 2 | |
| Myristyl alcohol | E | | | | | | | 1.6 |
| Lecithine, compact | $E_8$ | | | 0.5 | | | | |
| 2,2,4-Trimethyl-pentane-1,3-diol M.P. 53° C | $E_9$ | | | | 2.5 | | | |
| 2,2-Di-hydroxy-methyl-butan-1-ol | $E_9$ | | | | | 2.5 | | |
| Dicyclohexyl phthalate | $E_{10}$ | | | | | | 5 | |
| Ditetradecyl phthalate | $E_{11}$ | | | | | | | 2 |
| Ethanol | F | | 55 | 35 | 35 | 41 | | 45 |
| Isopropanol | F | | | | | | 48 | |
| Ethoxy-ethanol | $G_1$ | | | 35 | 35 | 20.9 | 22.9 | 35 |
| Dipentene | $G_2$ | | | 4.5 | 4.5 | 10 | 4 | |
| White spirit (150–160° C) | $G_5$ | | 15.9 | | | | | |

| | Type | Details | \multicolumn{7}{c}{Examples} |
| | | | 49 | 50 | 51 | 52 | 53 | 54 | 55 |
|---|---|---|---|---|---|---|---|---|---|
| Polyvinyl butyral | $A_5$ | (ap) | 6 | | 8 | | | | |
| Poly-(isobutyl methacrylate) Tukon hardness ca. 8 | $A_9$ | (as) | | 7 | | | | 4.5 | 5 |
| Colophane, grade WW | $A_{10}$ | | | | | 7.6 | 5 | | |
| Cyclohexanone-formaldehyde hard resin | $B_1$ | (d) | 4 | 4 | 4 | 4 | 4 | 4 | |
| Poly-(butyl methacrylate) | $B_2$ | (at) | | | | | 4 | | |
| Silicone resin M.P. 88° C | $B_9$ | (av) | | | | | | | 4 |
| Silicone oil 250 cSt at 25° C | C | | | 0.1 | 0.1 | 0.1 | 0.1 | 0.1 | 0.1 |
| Soft resin from rosin acids condensed with diethylene glycol | $D_2$ | | 6 | 5 | | | | | |
| Saccharoseaceto isobutyrate | $D_3$ | | | | 7 | 7 | 7 | 5.5 | 7 |
| Cetyl alcohol | $E_3$ | | 1 | 1 | 1 | 1 | 1 | 1.0 | 1 |
| Ethanol | F | | 58 | | | | | 0.6 | |
| Isopropanol | F | | | 74.4 | 71.4 | 71.8 | 62.9 | 63.0 | 74.4 |
| Methoxy-ethanol | $G_1$ | | 25 | | | | | | |
| Isopropoxy-ethanol | $G_1$ | | | | | | 16 | | |
| Methyl ethyl ketone | $G_3$ | | | | | | | 2 | |
| Acetone | $G_3$ | | | 1 | 1 | 1 | | 1.0 | 1 |
| Methyl isobutyl ketone | $G_3$ | | | 1.5 | 1.5 | 1.5 | | 1.3 | 1.5 |
| Dichloromethane | $G_7$ | | | | | | | 10.5 | |
| Decahydronaphthalene | $G_9$ | | | 5 | 5 | 5 | | 4.5 | 5 |
| Concentrate: designation* | | | G | H | I | J | K | L | M |

*see the table following Example 57

| | Type | Details | \multicolumn{4}{c}{Examples} |
| | | | 56* | 57* | 58* | 59* |
|---|---|---|---|---|---|---|
| Cellulose acetobutyrate | $A_1$ | (a) | 9 | 9 | 5 | 4.5 |
| Ketonic resin | $B_1$ | (d) | | 6 | 4 | 4 |
| Unmodified phenol formaldehyde resin (M.P. 79° C) | $B_5$ | | | | | |
| Melamine resin M.P. 63° C | $B_6$ | (aw) | 6 | | | |
| Silicone oil 25 cSt at 25° C | C | (ah) | | | | |
| Silicone oil 250 cSt at 25° C | C | (h) | 0.2 | 0.1 | 0.1 | 0.1 |
| Methyl abietate | $D_1$ | | | 10 | | |
| Colophane-polyol soft resin | $D_2$ | (i) | | | | 6 |
| Decyl oleate | $D_3$ | | | | 1 | |
| Trioctyl phosphate | $D_3$ | | | | | 6 |
| Non-drying, alkyd resin modified with castor oil | $D_9$ | (aj) | | | | |
| Hexadecyl laurate | $E_1$ | | | | 0.3 | |
| Refined copra M.P. 26° C | $E_2$ | | | 1.8 | | |

-continued

| | Type | Details | Examples | | | |
|---|---|---|---|---|---|---|
| | | | 56* | 57* | 58* | 59* |
| Lauryl alcohol, pure | E | | | 1.9 | | |
| Myristyl alcohol | $E_5$ | | | | | 1.5 |
| Polyethylene, Mol.weight ca. 1500 | $E_9$ | | | | | 1.5 |
| Isopropanol | F | | 44 | 58 | 50 | 50 |
| 2-Ethoxy-ethanol | $G_1$ | | | | | |
| 2-Methoxy-ethanol | $G_1$ | | 18 | 14 | 34.6 | 22.4 |

-continued

| | | Examples | | | | | | | | | | |
|---|---|---|---|---|---|---|---|---|---|---|---|---|
| | | 49 | 50 | 51 | 52 | 53 | 54 | 55 | 56 | 57 | 58 | 59 |
| | | (parts by weight) | | | | | | | | | | |
| butane | | | | | | 10.5 | | | | | | |
| dichloro-fluoro methane | | | | | | 24.5 | | | | | | |

| | Type | Details | Examples | | | | comparison with 5 components | |
|---|---|---|---|---|---|---|---|---|
| | | | 61 | 62 | 63 | 64 | 65 | 66 |
| Cellulose aceto-isobutyrate | $A_1$ | (a''') | 8 | 8 | 2.7 | | | |
| Poly-(isobutyl-methacrylate) | $A_9$ | (n) | | | | 7 | 10 | |
| Cyclohexanone-formaldehyde resin | B-1 | (d) | 5.5 | | | | | |
| Melamine resin | B-6 | (g) | | | | | | 13 |
| Styrene-maleic anhydride copolymer resin | $B_8$ | (am) | | | | 4 | | |
| Triazine | $B_{10}$ | (ax)* | | 5.5 | 1.9 | | | |
| Silicone oil 250 cSt at 25° C | C | (h) | | 0.1 | 0.1 | | | |
| Colophane-diethylene glycol soft resin | $D_2$ | (i) | 8.0 | 8 | 2.6 | | 3 | 4 |
| Sucrose acetobutyrate | $D_3$ | (k) | | | | 9 | | |
| Hydrogenated coconut oil fatty acid | $E_3$ | | | | | 2 | 1 | 1 |
| Cetyl alcohol | $E_5$ | | 2 | 2 | 0.7 | | | |
| Polyvinyl stearate | $E_7$ | (t) | | | | | 2 | 2 |
| Ethanol | F | | 35.75 | 35.75 | 12 | | | |
| Isopropanol | F | | | | 68 | 62.4 | 67.2 | 67.2 |
| 2-Ethoxy ethanol | $G_1$ | | 37.75 | 35.75 | 12 | | | |
| Limonene | $G_2$ | | 5 | | | | | |
| White spirit | $G_5$ | | | | | 15.6 | 16.8 | 16.8 |

| | | | | |
|---|---|---|---|---|
| 1,2-Dichloropropane | $G_7$ | | 10 | 10 |
| Adjuvant: Isopropyl acetate | | | 1 | |
| Concentrate: Designation* | | N | O | P | Q |

*see the Table below:

| | | Examples | | | | | | | | | | |
|---|---|---|---|---|---|---|---|---|---|---|---|---|
| | | 49 | 50 | 51 | 52 | 53 | 54 | 55 | 56 | 57 | 58 | 59 |
| Concentrate | G | 60 | | | | | | | | | | |
| " | H | | 65 | | | | | | | | | |
| " | I | | | 60 | | | | | | | | |
| " | J | | | | 70 | | | | | | | |
| " | K | | | | | 65 | | | | | | |
| " | L | | | | | | 65 | | | | | |
| " | M | | | | | | | 60 | | | | |
| " | N | | | | | | | | 65 | | | |
| " | O | | | | | | | | | 65 | | |
| " | P | | | | | | | | | | 70 | |
| " | Q | | | | | | | | | | | 75 |
| Propellant: | | 40 | 35 | 40 | 30 | 35 | 35 | 40 | 35 | 35 | 30 | 25 |
| Propellant composition: | | | | | | | | | | | | |

The gloss obtained with compositions of Examples 64, 65 and 66 is compared in the following table, stating the gloss values measured with a Brillantometer manufactured by Lange, Berlin, Germany as obtained after a first, second and third application on a wooden parquet surface, had a gloss of about 10, no intermediate or final polishing being applied.
The Lange standard is the gloss of a plate of window glass having a back backing.

| Gloss Values (in % of the Lange Standard) | | | |
|---|---|---|---|
| Example No. | 64 | 65 | 66 |
| First application | +27 | +3 | +3 |
| Second application | +32 | +10 | +2 |
| Third application | +8 | +5 | +5 |

These results show that it is necessary to employ at the same time Components A and B in the Composition according to the invention in order to obtain satisfactory gloss values.

ax)* the formula of the triazine employed in Examples 62 and 63 the following:

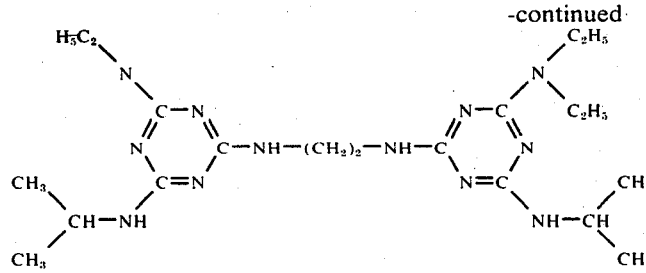

(XXVI)

Compositions having similar properties to those of the compositions of Examples 62 and 63 are obtained when replacing the above triazine of formula XXVI by another one falling under formula III, supra, in which the substituents are the following:

| Ex. No. | $R_1$ | $R_2$ | $R_3$ | $R_4$ | $R_5$ | $R_6$ | A |
|---|---|---|---|---|---|---|---|
| 62 a | $CH_3$ | $CH_3$ | $CH_3$ | $CH_3$ | H | H | $-(CH_2)_2-$ |
| 62 b | $CH_3$ | ⌬- | $CH_3$ | ⌬- | H | H | $-(CH_2)_2-$ |
| 62 c | $CH_3$ | $CH_3$ | $CH_3$ | $CH_3$ | H | H | $-(CH_2)_6-$ |
| 62 d | H | $C_2H_5$ | H | $C_2H_5$ | H | H | $-(CH_2)_6-$ |
| 62 e | $CH_3$ | $CH_3$ | $CH_3$ | $CH_3$ | $CH_3$ | $CH_3$ | $-(CH_2)_2-$ |
| 62 f | H | $C_2H_5$ | H | $C_2H_5$ | H | H | 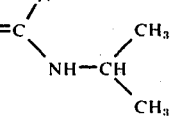 |
| 62 g | H | $C_2H_5$ | H | $C_2H_5$ | H | H | $-(CH_2)_2-$ |
| 62 h | $CH_3$ | ⌬- | $CH_3$ | ⌬- | — | — | piperazine-$CH_3$ |
| 62 i | | | | | H | H | $-(CH_2)_6-$ |
| 62 j | H | $-CH(CH_3)_2$ | H | $-CH(CH_3)_2$ | H | H | $-(CH_2)_2-$ |
| 62 k | H | $C_2H_5$ | H | $-CH(CH_3)_2$ | H | H | $-(CH_2)_2-$ |

Comparative Example 67

Example 1 was repeated, but in lieu of 8 parts by weight of cellulose acetobutyrate, 13.5 parts were used, and the cyclohexanone-formaldehyde resin was omitted from the formulation.

Comparative Example 68

Example 1 was repeated, but in lieu of 5.5 parts by weight of cyclohexanone-formaldehyde resin, 13.5 parts were used and cellulose acetobutyrate was omitted from the formulation.

The gloss values obtained with the two examples in the same manner as in Examples 64–66 are compared with those of Example 1 in the following table. (The gloss value of the untreated parquet floor was 10)

| Example No. | 1 | 67 | 68 |
|---|---|---|---|
| First application | + 35 | + 6 | + 25 |
| Second application | + 43 | + 19 | + 34 |
| Third application | + 46 | + 28 | + 45 |

Although the gloss values obtained in the case of Example 68 appear to be satisfactory, the resulting surface film does not dry satisfactory but remains tacky for an undue length of time. The composition of Example 68 can therefore not be used as a floor care agent.

| Components | | Liquid Agents Examples | | Concentrates Aerosol Examples | |
|---|---|---|---|---|---|
| | | 69 | 70 | 71 | 72 |
| Cellulose acetobutyrate | $A_1$ | 8 | 8 | | |
| Poly-(isobutyl methacrylate) Tukon-hardness ca. 8 | $A_9$ | | | 4.4 | 4.4 |
| Triazine of Formula XXVII* | $B_{10}$ | 5.5 | | 3.6 | |
| Triazine of Formula XXVIII** | $B_{11}$ | | 5.5 | | 3.6 |
| Silicone oil 250 cSt at 25° C | C | | | 0.1 | 0.1 |
| Soft resin from natural resinic acids and polyol | $D_2$ | 8 | 8 | | |
| Sucrose acetobutyrate | $D_3$ | | | 6.3 | 6.3 |
| Cetyl alcohol | $E_5$ | 2 | 2 | 0.9 | 0.9 |
| Ethanol | F | 35.75 | 35.75 | | |
| Isopropanol | F | | | 66.4 | 66.4 |
| Ethoxy-ethanol | $G_1$ | 35.75 | 35.75 | | |
| Dipentene | $G_2$ | 5 | 5 | | |
| Acetone | $G_3$ | | | 0.9 | 0.9 |
| Methyl isobutyl ketone | $G_3$ | | | 1.3 | 1.3 |
| Decahydronaphthalene | $G_6$ | | | 4.5 | 4.5 |
| Dichloromethane | $G_7$ | | | 10.7 | 10.7 |
| Adjuvant: Isopropyl acetate | | | | 0.9 | 0.9 |

65% parts by weight of the concentrate of Examples 71 and 72, respectively are mixed with 35 parts by weight of propellant as used in Examples 9 to 14, whereby compositions ready for spraying from aerosol dispensers are obtained.
*The triazine used in Examples 69 and 71 has the formula:

| | Liquid Agents Examples | | Concentrates Aerosol Examples | |
|---|---|---|---|---|
| Components | 69 | 70 | 71 | 72 |

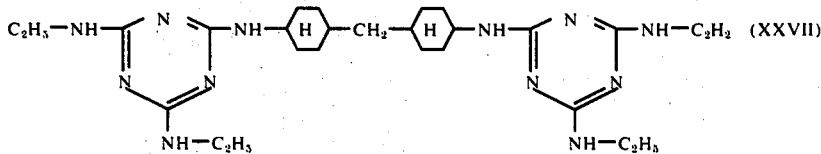   (XXVII)

**The triazine used in Examples 70 and 72 has the formula:

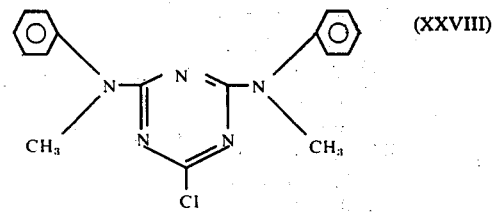   (XXVIII)

Details concerning the substances employed in the preceding examples a. cellulose acetobutyrate ($A_1$) having a repetitive unit of the formula

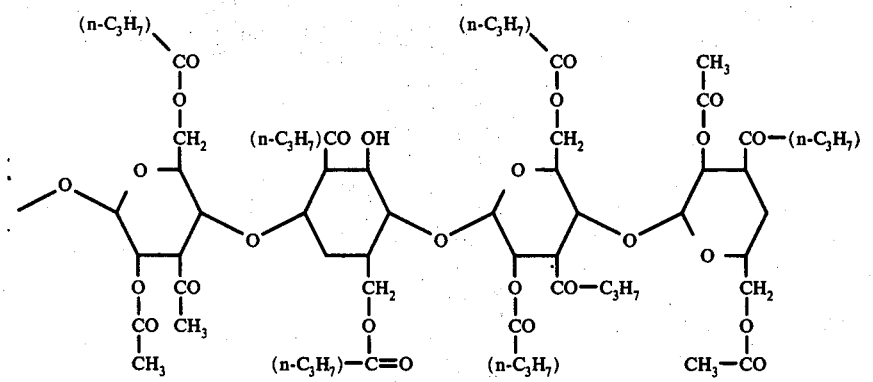   (XXII)

and which is soluble in ethanol and has a viscosity of 0.3 seconds measured according to ASTMD 1343-54 T with a solution according to D 871 54 T.

(a') cellulose acetobutyrate, similar to (a) but having a viscosity of 0.1 seconds measured in the same manner.

(a'') cellulose acetobutyrate, similar to (a) but having a viscosity of 0.5 seconds measured in the same manner.

(a''') cellulose acetoisobutyrate having a repetitive unit of a formula similar to Formula XXII, but in which the groups

are replaced by the groups

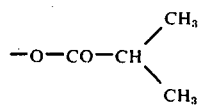

b. polyvinyl acetal ($A_5$)
melting point: 100° ± 5° C (determined according to Krämer-Sarnow).

viscosity: 40 ± 2 centipoises (determined with a 20% solution, calculated on the total weight of the latter, in a mixture of ethanol and ethyl acetate in a weight ratio of 85:15 as solvent).

c. poly-(methyl)-methacrylate ($A_9$)
density 1.09 at 25° C;
viscidity temperature 63° ± 2° C;
acid number about 7.

d. cyclohexanone/formaldehyde resin (ketonic resin) ($B_1$)
molar ratio 1:1; acid number less than 1; softening range: 105°–115° C.

e. poly-(butyl)-methacrylate ($B_2$)
viscidity temperature 77° C; Tukon hardness about 12 copolymer of methacrylic acid with butanol and isobutanol.

f. abieto-fumaric resin ($B_3$)
softening range (Ball and Ring) 125°–135° C;
acid number 280–300 g. melamine resin: ($B_6$)
melamine/formaldehyde condensation product;
melting point 62.5° C;
Sward hardness 58;
The product is soluble at a rate of 25% by weight in ethanol.

h. silicon oil 250 cSt at 25° (C).
density at 20° C 1;
viscosity 250 cSt at 25° C;
dilutable in all proportions in aromatic, aliphatic and chlorinated hydrocarbons, and in alcohols.

i. rosin/diethylene glycol soft resin ($D_2$)
  acid number less than 10
  saponification number about 15
  iodine number 140
  refractive index 1.525 ($n_D^{20}$ )
  Hoppler viscosity at 20° C about 200 poises
  specific weight at 20° C 1.07 to 1.08 g/cm³
j. carbamic soft resin ($D_7$)
  density at 20° C 1.1
  flash point 180°–200° C (with decomposition)
  viscosity (at 20° C) 130 poises
k. sucrose acetobutyrate ($D_{3a}$) of the formula

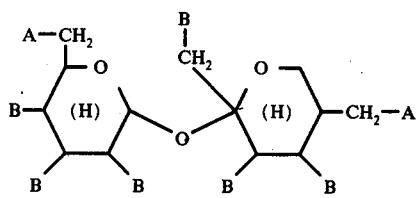
(XXIII)

wherein
  A represents the group —O—CO—$CH_3$,
  B represents the group —O—CO—$(CH_2)_2$—$CH_3$ and
  (H) represents a saturated ring.
k'. sucrose acetoisobutyrate of the Formula XXIII wherein A has the same meaning and B represents the group

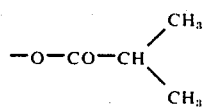

l. triazine of the formula ($E_{12}$)

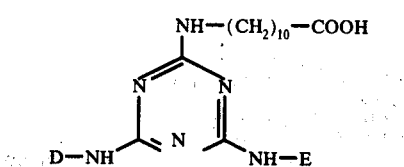
(XXIV)

wherein D and E each represent the group

—$(CH_2)_8$—CH=CH—$(CH_2)_7$—$CH_3$
having a melting point of 61° C.
l'. triazine falling under the Formula XXIV in which D represents the same group as above and E represents the group —NH—$(CH_2)_{17}$—$CH_3$.
l''. triazine plasticizer of the formula

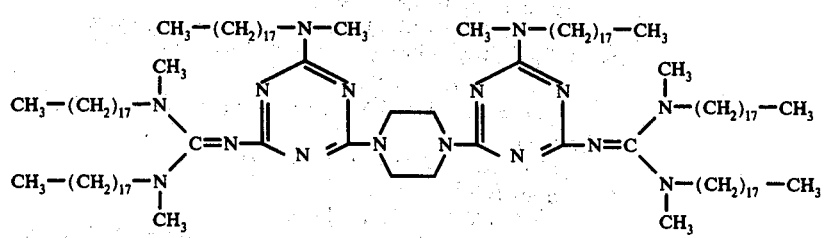
(XXV)

having a melting point of 43° to 46° C.

m. hydroxypropyl cellulose ($A_3$)
  An aqueous solution having a concentration of 5% by weight and having a viscosity at 25° C of 25 to 150 centipoises (measured according to Brookfield).
n. poly-(isobutyl)-methacrylate ($A_9$)
  Tukon hardness about 8
  specific weight 1.10 at 20° C
  viscosity at 20° C in a 40% solution of:
    benzene 2,000 cps
    toluene 570 cps
    xylene 975 cps
    methyl isobutyl ketone 1425 cps
o. phenol-terpene resin ($B_3$)
  melting range 117°–130° C
  acid number 60°–70°
  viscosity 20–30 centipoises in a 50% by weight toluene solution at 20° C.
p. silicone oil 200 centistokes at 25° C (C)
  density 1.04 to 1.06
  flash point > 160° C
  acid number < 1
  surface tension 24 dynes/cm
q. non-drying modified alkyd resin ($D_9$) containing 33% of phthalic anhydride and 42% of coconut oil.
r. phthalic resin, pure ($B_4$)
  melting point 98° C
  acid number 180 to 200
s. non-drying alkyd resin modified by fatty acid ($D_9$) containing 31% of phthalic anhydride and 23% of fatty acid, having an acid number of 12 – 18 and a hydroxyl number of about 140.
t. polyvinyl stearate ($E_7$)
  melting point 48°–50°
  penetration index 1 to 2
  density 0.93 to 0.94 at 20° C
  viscosity 400 centistokes at 70° C and 200 centistokes at 100° C (according to Ubbelohde)
  acid number less than 1
  saponification number 0
  ash 0
  non-saponifiable 100%
u. triazine of the formula ($E_{13}$)

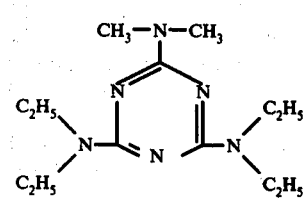

v. ethyl cellulose ($A_3$)
  viscosity of 8 to 11 centipoises in a 5% by weight solution of a toluene/ethanol mixture in a weight ratio of 80 : 20 at 25° C.

w. poly-(propyl)-methacrylate ($A_9$)

Tukon hardness 7 to 8
density 1.07 at 25° C
viscidity temperature 40° ± 2° C
acid number less than 10
viscosity in a 40% isopropanol solution 8000 centipoises at 20° x. soft resin from rosin acid condensed with diethylene glycol (D2)
acid number 2 to 3
coloration index in a 50% acetone solution 1 to 2
density 1.06 to 1.07 g/ml at 20° C
hydroxyl number 120 to 145 y. polyglycol P 2000 (D6)
molecular weight about 2000
density 1,002 at 20° C
refractive index 1.450 at 25° C
pour point 0° C; flash point 445° F; fire point 510° F
viscosity 1880 centistokes at 0° C.

z. triazine of the formula (E14)

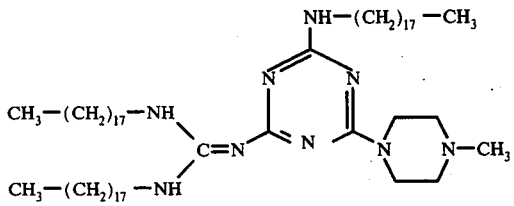

having a melting point of 66° – 69° C.

ad. modified phenoplastic resin (A6)
melting range 55° to 60° C
acid number 80 to 95
soluble in alcohols, glycol ethers, ketones and esters, slightly soluble in aliphatic hydrocarbons.

ae. modified aminoplastic resin (A7)
type: modified urea-formaldehyde resin
coloration index 2 (DIN 53,403)
acid number 6 maximum (DIN 53,402)
viscosity (Höppler viscosity at 20° C) in a 60% isobutanol solution: 8 to 10 poises.

af. modified aminoplastic resin (A7)
type: modified melamine-formaldehyde resin
coloration index 0 to 1
acid number about 0.5
viscosity in a 55% isobutanol solution: about 200 seconds (cup DIN 4 at 20° C)
soluble in any proportion in the following solvents: ethanol, isopropanol, butanol, ethylene glycol.

ag. pure phenol resin (B5)
melting range 75 to 83° C (capillary method)
acid number 0
soluble in any proportion in alcohols and glycol ethers.

ah. silicone oil 100 cSt at 25° C (C)
poly-(methyl)-siloxane oil
density at 25° C 0.968
flash point 290° C
freezing point – 55° C
refractive index 1.403 at 25° C ai. silicone oil 25 cSt at 25° C (C)
density at 25° C 0.969 to 0.991
refractive index 1.4572 to 1.4603 at 25° C
flash point 120° C minimum
acid number 0.25 maximum
soluble in any proportion in: ethanol and isopropanol aj. non-drying alkyd resin modified by ricinus oil (D9)
content of phthalic anhydride 32%
content of oil 54%
acid number <20
viscosity in a 50% xylene solution (cup DIN 4 - 20° C) 130 to 170 seconds = 550 to 770 centipoises,
soluble in any proportion in glycol ethers and alcohols, insoluble in aliphatic hydrocarbons.

ak. polyalkylene-polyamide (A8)
a 14% ethanol solution having a density at 20° C of 0.09 g/ml and a viscosity of 250 centipoises at 20° C (Nylosol 3000 distribured by Protex 92-Levallois, France).

al. unmodified urea-formaldehyde resin (B7)
acid number 1
viscosity in a 60% isobutanol solution (cup DIN 4, at 20° C) about 500 seconds am. styrene/maleic anhydride copolymer (B8)
molecular weight about 1,900
melting range 135° to 150° C
acid number 220
viscosity in a 10% acetone solution at 30° C 0.76 centistoke an. silicone oil 1000 cSt at 25° C (C)
poly-(dimethyl)-siloxane
flash point 316° C (ASTM D92)
density 0.972 at 25° C ao. unmodified non-drying alkyd resin (D8)
acid number <20
viscosity in a 50% butyl acetate solution about 25 seconds (about 100 cp) (cup DIN 4 - 20° C)
soluble in any proportion in glycol ethers ap. polyvinyl butyral (A5)
viscosity at 20° C in a 5% ethanol solution (prepared at 95° C) 10 centipoises
acidity, calculated as acetic acid
less than 0.05%
content of polyvinyl alcohol about 20%
content of polyvinyl acetate about 3% as. poly-(isobutyl)-methacrylate (A9)
Tukon hardness 8
specific weight at 25° C 1.09
viscidity temperature 63° C ± 2° C
Brookfield viscosity in a 40% isopropanol solution at 25° C 4,500 centipoises at. poly-(butyl)-methacrylate (B2)
Tukon hardness 12
specific weight at 25° C 1.11
viscidity temperature 57° C ± 2° C
Brookfield viscosity at 25° C in a 40% isopropanol solution 2,400 centipoises.

au. unmodified phenol-formaldehyde resin (B5)
melting point 79° C (capillary method)
acid number 0
soluble in any proportion in alcohols and glycol ethers, insoluble in aliphatic and aromatic hydrocarbons.

av. silicone resin (B9)
melting point 88° C
soluble in isopropanol
silicone/ethylene glycol copolymer aw. melamine resin (B₆)
melting point 62.5° C
soluble in ethanol (up to 25% by weight)
Sward hardness 58

We claim:
1. A coating-forming liquid anhydrous composition comprising
   a. as film-forming agent,
      a solid macromolecular organic compound (A) which is independently film-forming or capable of being rendered film-forming by admixture therewith of from about 1 to 5% of a plasticizer, while being incapable by itself of plasticizing the said hard resin (b); the said film-forming compound (A) has at 20° C a Tukon hardness of at most 10 and, when plasticized in a molar ratio of 3:1 with dibutyl phthalate, has at 20° C a Sward hardness between 2 and 30; the said film-forming compound (A) is soluble in at least one of ethanol and isopropanol and is present in said liquid composition in a proportion of from 3 to 35%, based on the total weight of the latter composition;
   b. as a varnish-constituent hard resin component, a resin (B) which is not film-forming by itself and which is insoluble in hydrocarbon solvents, which has a Tukon hardness at 20° C above 10 and, plasticized in a molar ratio of 3:1 with dibutyl phthalate, a Sward hardness at 20° C greater than 50; the lower limit temperature of its softening range being less than 60° C; said hard resin (B) being compatible with constituents (A), (E) and (D) and soluble in at least one of ethanol and isopropanol, and being present in a proportion of from 0.5 to 15%, based on the total weight of said liquid composition;
   c. as plasticizing agent for at least one of components (A) and (B), a mixture of
      c'. from about 0.05 to 20% based on the total weight of the composition of a liquid organic, hard resin-plasticizing compound (D) which has a melting point below 15° C, a molecular weight above 150, a viscosity, in undissolved state and at 20° C, of from 50 centipoises to 1000 poises, an acid number of at most 50, a refraction index at 20° C of from 1.350 to 1.550, a vapor pressure at 20° C of less than 0.001 Torr, and a drop of 0.1 gram of this liquid plasticizing compound placed on a glass plate requiring, at 20° C and under an ambient air pressure of 760 Torr, more than 2 hours for complete evaporation; this said plasticizing compound on being heated at 100° C for 100 hours showing a weight loss which ranges from 1 to 2.5% of the initial weight of the plasticizing compound; from 0 to at most 25%, calculated on the total weight of the said liquid composition, of the liquid plasticizing agent consisting of a silicone oil (C) having at 25° C a viscosity ranging from 0.5 to 100,000 centistokes; and
      c''. from about 0.1 to 15%, based on the total weight of said liquid composition, of a solid plasticizing compound (E) which is compatible and miscible with compound (D), has a melting point above 40° C, a penetration index at 20° C between 1 and 80, a cube of 0.1 gram of which solid plasticizing compound placed on a glass plate at 20° C and under an ambient pressure of 760 Torr requires more than 2 hours for its complete evaporation, and being capable of plasticizing at least the film-forming agent (a) or the hard resin (b); and
   d. as a volatile solvent mixture inert to components (A) to (E) inclusive, a mixture of an alkanol (F) of from 1 to 4 carbon atoms, present in a proportion of about 25 to 90%, calculated on the weight, of the said liquid composition, and an organic solvent (G) which is chemically unreactive toward all the other constituents, and is present in a proportion of 1 to 45% calculated on the weight of the said liquid anhydrous composition; said organic solvent (G) containing per molecule thereof from 0 to 2 hydroxyl groups; and, when containing per molecule a single hydroxyl group and being otherwise free from oxygen atoms, solvent (G) having at least five carbon atoms per molecule; the melting point of solvent (G) being below 15° C, its boiling point between 50° and 300° C, its viscosity at 20° C below 30 centipoises and, when its molecule is free of hydroxyl groups, a droplet of 0.5 milliliters thereof placed on a glass plate evaporating, at 20° C and an ambient air pressure of 760 Torr, in less than 3000 seconds; and, when its molecule contains from 1 to 2 hydroxyl groups, a droplet of 0.5 milliliters thereof evaporating at 20° C and 760 Torr in an interval of from 34 to 3000 seconds;
   said plasticizer components (D) and (E) being soluble in said solvent mixture.

2. A coating-forming liquid anhydrous composition as defined in claim 1, wherein the proportion of component (A) is from 5 to 15% based on the total weight of the composition.

3. A coating-forming liquid anhydrous composition as defined in claim 2, wherein the proportion of component (B) is from 1 to 10% based on the total weight of the composition.

4. A coating-forming liquid anhydrous composition as defined in claim 3, wherein the proportion of said solid plasticizer (E) is from 0.25 to 8% based on the total weight of the composition.

5. A coating-forming liquid anhydrous composition as defined in claim 4, wherein the proportion of said alkanol (F) is from 30 to 55% based on the total weight of the composition.

6. A coating-forming liquid anhydrous composition as defined in claim 5, wherein the proportion of component (G) is from 5 to 40% based on the total weight of the composition.

7. A coating-forming liquid anhydrous composition as defined in claim 6, wherein said liquid plasticizer (D) is free from silicone (C) and the proportion of (D) is from 1 to 20% based on the total weight of the composition.

8. A coating-forming liquid anhydrous composition as defined in claim 6, wherein said liquid plasticizer (D) contains from 0.05 to 4% of silicone (C), based on the total weight of the composition.

9. A coating-forming liquid anhydrous composition as defined in claim 6, wherein said liquid plasticizer (D) contains from 0.1 to 4% of silicone (C) and is in a proportion of from 0.1 to 15%, percentages being based on the total weight of the composition.

10. A coating-forming liquid anhydrous composition as defined in claim 7, wherein the proportion of said liquid plasticizer (D) is from 3 to 15% based on the total weight of the composition.

11. A coating-forming liquid anhydrous composition as defined in claim 6, wherein the molecules of said organic solvent (G) are free from amino-nitrogen, imino-nitrogen and sulfur.

12. A coating-forming liquid anhydrous composition as defined in claim 10, wherein said solid macromolecular organic compound (A) is a cellulose nitrate (A2); said liquid organic hard-resin plasticizing compound is a monomeric ester of a resin acid of colophony and of a polyhydric alcohol having from 2 to 3 hydroxyl groups (D2); said solid plasticizing compound (E) is a fatty alcohol having from 12 to 22 carbon atoms (E5); and said organic solvent (G) is an alcohol corresponding to the formula $$R - A - OH -  \qquad (XIII)$$

wherein R represents an alkoxy group from 1 to 6 carbon atoms and A represents a divalent hydrocarbon radical of a chain of from 2 to 6 carbon atoms.

13. A coating-forming liquid anhydrous composition as defined in claim 12, wherein component A2 is nitrocellulose; said varnish constituent hard resin B is an aldehyde/ketone resin (B 1) having a molar ratio of aldehyde-to-ketone of about 1:1; D2 is a colophony/diethylene glycol soft resin; E5 is cetyl alcohol; F is ethanol, and G is ethoxyethanol.

14. A coating-forming liquid anhydrous composition as defined in claim 13, wherein B1 is a rosin/diethylene glycol soft resin.

* * * * *

UNITED STATES PATENT AND TRADEMARK OFFICE
CERTIFICATE OF CORRECTION

PATENT NO. : 3,992,335
DATED : November 16, 1976
INVENTOR(S) : Serge Denissenko, et al It is certified that error appears in the above-identified patent and that said Letters Patent are hereby corrected as shown below:

Title page, item [30], add the following:

March 3, 1971    France    71,10364

Signed and Sealed this

Twenty-first Day of June 1977

[SEAL]

Attest:

RUTH C. MASON
Attesting Officer

C. MARSHALL DANN
Commissioner of Patents and Trademarks